US012785968B2

(12) United States Patent
Radman

(10) Patent No.: US 12,785,968 B2
(45) Date of Patent: Nov. 3, 2026

(54) AUTONOMOUS COMPUTING SYSTEM FOR CRYPTOGRAPHIC ASSET TOKENIZATION, DIGITAL CURRENCY OPERATIONS, REDEMPTION, DETOKENIZATION, AND LIFECYCLE MANAGEMENT

(71) Applicant: John Radman, Melbourne (AU)

(72) Inventor: John Radman, Melbourne (AU)

( * ) Notice: Subject to any disclaimer, the term of this patent is extended or adjusted under 35 U.S.C. 154(b) by 0 days.

(21) Appl. No.: 19/082,229

(22) Filed: Mar. 18, 2025

(65) Prior Publication Data

US 2025/0337580 A1 Oct. 30, 2025

(30) Foreign Application Priority Data

Apr. 29, 2024 (AU) ................................ 2024901205

(51) Int. Cl.

| | |
|---|---|
| ***H04L 9/32*** | (2006.01) |
| ***G06Q 20/38*** | (2012.01) |
| ***G06Q 20/40*** | (2012.01) |
| ***H04L 9/00*** | (2022.01) |
| ***H04L 9/08*** | (2006.01) |

(52) U.S. Cl.

CPC ..... *H04L 9/3213* (2013.01); *G06Q 20/38215* (2013.01); *G06Q 20/3823* (2013.01); *G06Q 20/3825* (2013.01); *G06Q 20/3829* (2013.01); *G06Q 20/401* (2013.01); *H04L 9/008* (2013.01);*H04L 9/0825* (2013.01); *H04L 9/3221* (2013.01); *H04L 9/3247* (2013.01)

(58) Field of Classification Search

None

See application file for complete search history.

(56) References Cited

U.S. PATENT DOCUMENTS

| | | | | |
|---|---|---|---|---|
| 2019/0081789 | A1* | 3/2019 | Madisetti | H04L 9/0637 |
| 2020/0327609 | A1* | 10/2020 | Dubrofsky | G06Q 40/06 |
| 2021/0082044 | A1* | 3/2021 | Sliwka | G06Q 10/103 |

OTHER PUBLICATIONS

Kozhan, Roman et al. "Decentralized Stablecoins and Collateral Risk" [online] ACFR, Sep. 1, 2021 [retrieved Oct. 14, 2025]. Retrieved from the Internet: URL: https://acfr.aut.ac.nz/_data/assets/pdf_file/0004/570307/DAI_Paper_SSRNSeptember2021.pdf (Year: 2021).*

* cited by examiner

*Primary Examiner* — Taghi T Arani
*Assistant Examiner* — Joshua Raymond White

(57) ABSTRACT

The present invention provides an autonomous computing system for cryptographic asset tokenization, digital currency operations, redemption, detokenization, and full lifecycle management of tokenized assets. The system leverages formal cryptographic proofs, hybrid off-chain and on-chain ledger synchronization, and automated execution protocols to enhance regulatory compliance, asset-backed stability, and operational autonomy. Smart contracts, cryptographic hash-based commitments, and distributed validation mechanisms ensure secure, verifiable, and tamper-resistant transactions across decentralized, centralized, and hybrid environments. The system governs the entire token lifecycle by intrinsically linking asset state validation to both on-chain and off-chain records. Hardware-agnostic cryptographic processing enforces governance rules, validates asset-backed token states, and prevents over-issuance. Real-time integrity checks and automated reconciliation deliver a scalable, cryptographically secured framework for autonomous management of tokenized assets and digital currency transactions, minimizing reliance on intermediaries.

10 Claims, 7 Drawing Sheets

AUTONOMOUS COMPUTING SYSTEM FOR CRYPTOGRAPHIC ASSET TOKENIZATION, DIGITAL CURRENCY OPERATIONS, REDEMPTION, DETOKENIZATION, AND LIFECYCLE MANAGEMENT

CROSS REFERENCE TO RELATED APPLICATIONS

This application claims priority to Australian Provisional Patent Application No. 2024901205, filed on Apr. 29, 2024, which is incorporated herein by reference in its entirety.

STATEMENT REGARDING FEDERALLY SPONSORED RESEARCH

Not Applicable.

FIELD OF THE INVENTION

The present invention relates to financial technology (FinTech), specifically to systems and methods for asset tokenization and lifecycle management, including digital currency issuance, redemption, and detokenization in decentralized, centralized, or hybrid environments.

BACKGROUND OF THE INVENTION

Value exchange mechanisms have evolved from barter to commodity-backed money and fiat currency, each innovation addressing prior inefficiencies while introducing new constraints. Fiat currency systems, while facilitating economic expansion, rely on centralized issuance and debt-based creation, leading to inflationary pressures and currency instability. Digital currencies sought to overcome these limitations but introduced volatility, regulatory uncertainty, and reliance on consensus mechanisms that are computationally expensive and inefficient at scale. Additionally, many blockchain-based tokenization and digital currency systems do not fundamentally improve upon traditional financial structures but instead replicate legacy operations on-chain while still inheriting many of the limitations of traditional off-chain frameworks.

Existing asset tokenization frameworks rely on outdated, fragmented processes that fail to provide full automation, seamless integration, and have no bidirectional functionality for implicit asset backing. Traditional models treat tokenization, minting, redemption, and detokenization as disjointed operations requiring manual intervention, integration with legacy off-chain systems, or third-party oversight, leading to inefficiencies, lack of user control, and limited scalability. These limitations prevent existing tokenization models from achieving true autonomy and decentralization creating a structural barrier to widespread adoption and financial innovation.

Additionally, existing systems lack a technically robust redemption or detokenization process, preventing seamless release of underlying assets and retirement of asset tokens without reliance on external approvals. Current frameworks do not dynamically adjust token representation or asset backing, limiting the flexibility required for real-world, adaptive asset tokenization. Furthermore, there is no ability to allow partial or optional conversion into digital currency, restricting users' ability to convert these tokenized assets into a fungible digital currency without relinquishing possession, use, or ownership of the underlying asset in many scenarios.

Current tokenization models either fail to integrate critical asset representation capabilities or rely on centralized intermediaries, which limit user autonomy and scalability. Many systems impose rigid conversion pathways, preventing dynamic adjustments or partial conversion of assets into digital form. These restrictions reduce practical liquidity and prevent seamless interactions between tokenized assets and exchangeable units. Additionally, traditional tokenization and redemption processes are unidirectional, offering no structured mechanism for asset recovery once tokenized, leaving users dependent on third-party control. Unlike prior decentralized finance (DeFi) solutions, which focus on isolated aspects of asset conversion, existing systems lack a unified, automated lifecycle for tokenized assets, further fragmenting liquidity management and preventing seamless asset interoperability.

Existing tokenization frameworks lack integration, adaptability, and automation, treating tokenization and redemption as separate processes that require manual coordination or reliance on centralized intermediaries. Furthermore, current frameworks lack a standardized, widely adopted approach for autonomous detokenization; once assets are tokenized, they cannot be seamlessly converted back into their original form without external approval. This results in inefficiencies, limits liquidity, and restricts the practical usability of tokenized assets.

Traditional systems and (DeFi) solutions restrict user-controlled redemption or detokenization, forcing reliance on intermediaries to reclaim tokenized value. Without an autonomous process, asset holders cannot independently exit the system, while centralized redemption control creates liquidity bottlenecks that hinder smooth transitions among tokenized assets, digital representations, and underlying assets. Existing models lack a structured, automated approach to bidirectional conversion, preventing users from dynamically interacting with their assets in a fluid and decentralized manner. This limitation highlights the need for a more adaptive, autonomous framework that ensures transparency, flexibility, and security across the entire tokenization lifecycle.

SUMMARY OF THE INVENTION

This invention introduces a self-regulating, automated system that integrates the full lifecycle of asset tokenization, digital currency issuance, redemption, and detokenization, while also offering the flexibility to bypass currency minting when needed. By leveraging deterministic computational processes, cryptographic validation, and a configurable ledger architecture, the system ensures security, transparency, and verifiability across all operations. Unlike existing models, which require predefined rigid tokenization structures, this system introduces modular and adaptable conversion mechanisms, allowing optional or partial conversion into digital currency while supporting multi-dimensional asset tokenization based on ownership, utility, financial value, and/or governance rights.

A key innovation is the system's ability to process asset tokenization, redemption, and detokenization in an autonomous, configurable manner, independent of currency minting requirements. Unlike prior solutions, which restrict tokenized assets to singular digital representations, this invention allows for multiple coexisting digital formats, enabling seamless transitions between tokenized ownership, tradable assets, and operational utilities. For example, assets may be tokenized for immediate operational use, then later redeemed or detokenized without requiring an intermediate currency minting step. This adaptability ensures that the system accommodates a broad range of operational and regulatory applications without requiring custodial intermediaries, providing decentralized user control over asset monetization.

The system supports a diverse set of asset classes, including tangible assets such as real estate, land, and infrastructure, as well as digital assets, intellectual property, patents, and other intangible financial instruments. Asset tokens may be configured to function solely as non-transferable utility tokens for internal system use or as tradeable digital representations of asset value. Unlike existing models, which enforce rigid token functionality, the system dynamically allows asset tokens to serve multiple roles simultaneously, depending on user configurations and smart contract parameters.

To maintain an adaptive and structured asset-backed issuance model, the system algorithmically adjusts the available digital currency supply based on a predefined ratio linked to the verified valuation of the underlying asset. This ensures that all digital currency issuance remains strictly constrained by an auditable and provable asset reserve, creating a structured asset-backed model in which digital currency generation is autonomously regulated. The system further prevents inflationary risks by enforcing real-time asset validation, ensuring that token supply adjustments correspond to underlying asset values.

In various embodiments, asset tokens serve as functional units that enable autonomous minting of digital currency. Users may exchange tokenized representations of assets for digital currency, or they may bypass minting entirely and engage in direct asset-based transactions. Unlike traditional frameworks that treat these functions separately, this system introduces an integrated architecture where ownership rights, financial value, and operational utility can coexist dynamically within the same infrastructure.

A distinctive feature of this invention is that asset holders can unlock liquidity without relinquishing asset ownership, custody, or operational control. Unlike traditional models that require custodial transfer or intermediary approval, this system enables asset owners to selectively monetize their holdings through digital currency issuance, direct asset-token transactions, or hybrid tokenization models. By supporting multiple monetization strategies within a single framework, the system eliminates reliance on manual redemption processes, centralized clearinghouses, and traditional financial gatekeepers.

The system's bidirectional structure ensures that minted digital currency remains explicitly backed by assets, providing an intrinsic valuation mechanism. An asset owner can mint digital currency using asset tokens as functional utility tokens. In reverse, they must return an equivalent amount of digital currency in exchange for asset tokens to reclaim their underlying assets through detokenization. If minting is skipped, the system still enables direct redemption and detokenization of asset tokens, ensuring a flexible and self-executing framework for asset management and liquidity control. By integrating ownership, tokenized utility, and automated governance within a unified structure, the system enables real-time asset interactions without dependency on third-party control.

To mitigate valuation risks and manage asset impairment scenarios, the system employs an adaptive valuation algorithm that calculates tokenizable asset value based on multiple parameters, including real-time market conditions, asset-specific risk factors, and predefined pledging criteria. This algorithm dynamically determines the tokenization ratio, ensuring that the number of issued tokens reflects a provable asset valuation metric. The tokenization module then mints asset tokens in direct proportion to the derived valuation, with the ratio configurable for leverage (e.g., 1:4 tokenization) or deleverage (e.g., 2:1 asset-backed adjustment) depending on the asset class and system rules. Once issued, these tokens operate within a market-driven environment, allowing them to serve as exchangeable financial units, operational utility assets, or hybrid tokenized representations.

A critical innovation of this invention is the integration of an autonomous arbitrage mechanism that ensures currency stability and implicit proof of reserves. The system enables users to autonomously adjust the currency supply through a bidirectional asset mechanism. Supply expands when digital currency values exceed those of tokenized assets and contracts when the reverse is true, balancing intrinsic value alignment. By integrating an adaptive, real-time price equilibrium capability, this system inherently validates the presence of asset backing, allowing participants to benefit from arbitrage-driven self-regulation, without requiring custodians or manual attestations.

By seamlessly linking real-world assets to digital currency and supporting a flexible, modular and user-controlled approach to tokenization, redemption, and detokenization, this invention establishes a scalable, structured framework for decentralized financial systems, ensuring interoperability with on-chain and off-chain systems. The system achieves this through a combination of on-chain valuation oracles, private blockchain integrations, and API-based off-chain interactions, enabling consistent data synchronization across decentralized and traditional offline data infrastructures. It enhances user autonomy, mitigates systemic risks, and creates a scalable, highly efficient, and cost-effective autonomous financial system backed by assets of intrinsic value.

BRIEF DESCRIPTION OF THE DRAWINGS

Various embodiments of the invention are illustrated and described in the following detailed description and accompanying drawings, which provide an overview of the system's key processes and operational components.

Figure 1:
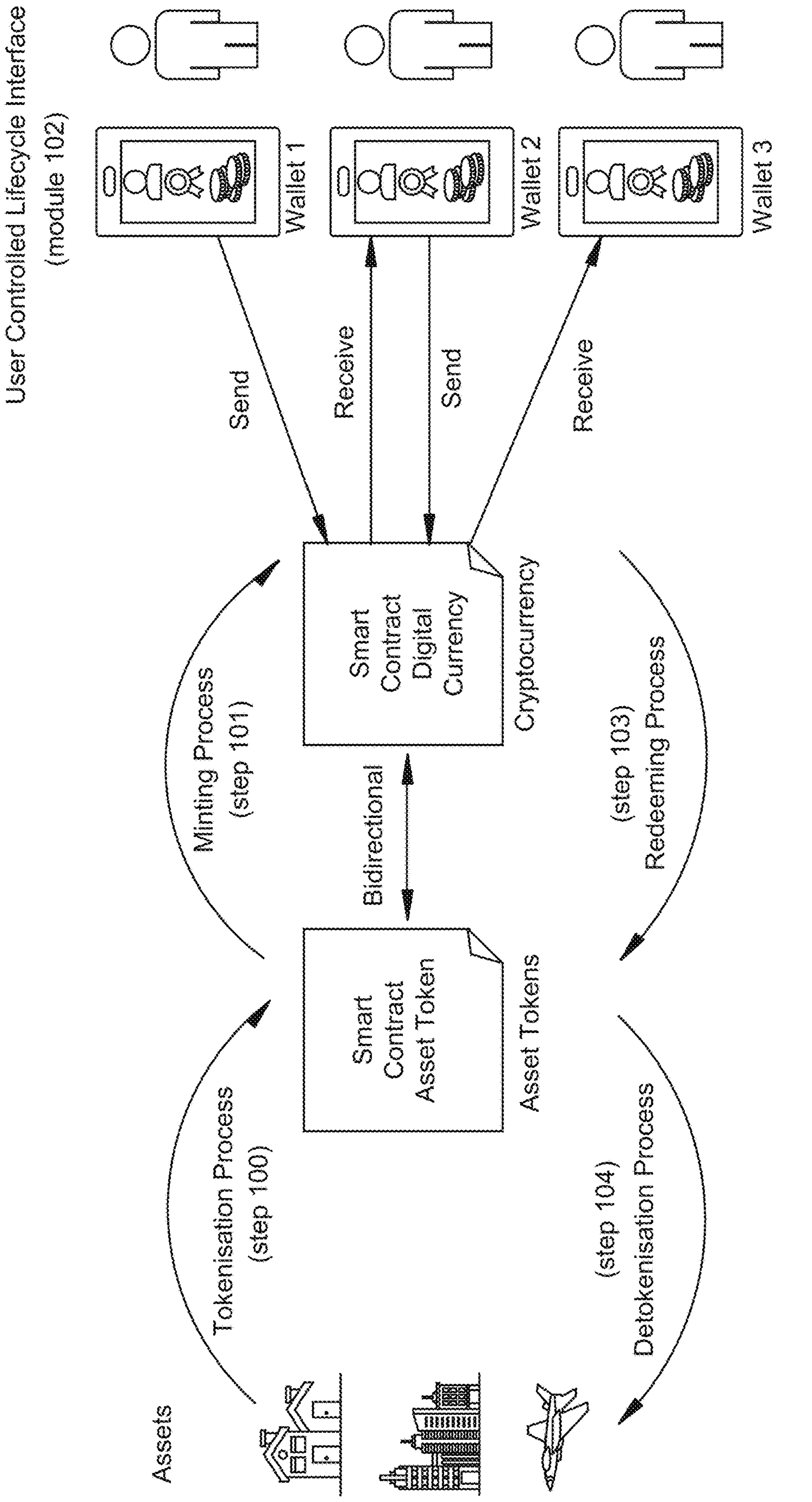
FIG. 1 is a flow diagram providing an overview of an example system implementation for asset tokenization and monetization as a medium of exchange, including redemption and detokenization.

Common reference numerals are used throughout the figures and the detailed description to indicate like elements. One skilled in the art will recognize that the figures presented are exemplary, and that alternative architectures, operational sequences, and functional elements may be implemented without deviating from the scope of the invention as set forth in the claims.

DETAILED DESCRIPTION OF THE INVENTION

The following detailed description presents exemplary embodiments to illustrate the principles of the invention. These embodiments serve as illustrative examples and are not intended to limit the invention in any way. The scope of the invention extends to variations, modifications, and equivalents, as defined by the claims. For clarity, certain technical concepts and standard background details have been selectively omitted to maintain focus on novel aspects.

Various specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

As used herein, 'assets' or 'underlying assets' refer to any tangible or intangible resource with inherent or derived value, whether physical, financial, or monetary, that can be quantified, recorded, and utilized in economic or transactional systems.

As used herein, the term "configured to" means that a component, module, or system is designed, programmed, arranged, or otherwise capable of performing a specified function or operation. The phrase does not require permanent or dedicated capability and may encompass hardware, software, firmware, or any combination thereof that is capable of performing the stated function.

As used herein, the term 'module' refers to any executable implementation, including but not limited to software code, smart contracts, program instructions, or computational logic, whether implemented via a processor, distributed ledger, or other execution environment. The term 'module' refers to any computational function or process executed within the system, whether referred to as a 'module,' 'component,' 'executable,' 'engine,' or an equivalent term.

As used herein, the term "digital currency" refers to any form of currency that exists in a digital format and is used to conduct economic transactions, including but not limited to electronic money, virtual currency, and cryptocurrency. In the embodiments below, references are made to digital currency broadly, and more specifically to cryptocurrency, which is a more secure manifestation of digital currency. Either description is intended to be used interchangeably within the following embodiments.

It will be further understood that the term "on-chain," when used in this specification, refers to operations, processes, data, or systems executed or implemented on a blockchain, whether operating in a public, private, or hybrid environment, or any combination thereof. The use of the term "on-chain" does not preclude the inclusion of additional off-chain operations, systems, or components, or the interaction between on-chain and off-chain systems.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Technical Overview and Functional Impact

The present invention introduces an autonomous system for the digital self-monetization of assets, implemented via one or more computing environments (e.g., cloud servers, distributed nodes, or blockchain-based networks), enabling asset owners to directly create and transact with a digital medium of exchange without requiring intermediaries, third-party custody, or external asset reserve verifications. In certain embodiments, a network of computing nodes maintains a trustless execution environment, eliminating centralized oversight while ensuring verifiable security. Additionally, asset tokens are stored and managed in a ledger employing a cryptographic commitment scheme for data integrity and supporting zero-knowledge validation for privacy-preserving audits, ensuring all transactions remain both verifiable and confidential.

These processes are executed by a network of computing nodes, each running deterministic smart contract logic and cryptographic verification routines to maintain a trustless and tamper-resistant execution environment.

The present invention addresses technical inefficiencies in asset tokenization and digital currency ecosystems by enabling fungibility while ensuring verifiable asset backing, stabilizing cryptocurrency value through user-driven arbitrage mechanisms, and establishing an autonomous framework for computationally enforced economic exchange without reliance on third-party intermediaries. All validation, token creation, redemption and detokenization steps can be implemented via on-chain transactions, cryptographic hashes, and ledger updates, enforced by consensus protocols.

This invention, through the design, creation, and development of its modular components and their interactions, enables the following unprecedented outcomes:

Self-Monetization of Assets: This term refers to an individual or entity's ability to autonomously convert verified and tokenized assets into a digital medium of exchange without reliance on centralized custodians or manual approvals. The process is automated through cryptographically secured smart contracts and, in some embodiments, real time valuation oracles, ensuring instant liquidity for pledged assets without external intervention. Upon onboarding, decentralized nodes executing the relevant smart contracts enable asset owners to issue and transact with asset backed digital currency while retaining full control. Liquidity is maintained through deterministic programmable execution mechanisms. The process includes the conversion or minting of digital currency from asset tokens using cryptographic methods, followed by the redemption of digital currency for asset tokens, which are then detokenized to fully release the underlying assets from any obligations tied to the system. Pledged asset records are stored either on chain or in a secure off chain repository, with references hashed onto a distributed ledger.

Retaining Ownership Benefits: The present invention enables asset holders to retain ownership, control, and use of their assets while selectively monetizing them through either digital currency issuance or asset token-based transactions, all within a unified and modular ecosystem. This is achieved without requiring liquidation, external credit approval, or restrictive lending arrangements, ensuring direct and autonomous access to liquidity while maintaining full functional use of the asset. Smart contract logic ensures that assets remain pledged until the corresponding digital currency is redeemed for asset tokens and fully detokenized to enable the release of the underlying assets.

Flexibility in Asset Representation: By separating the digital cryptocurrency from direct claims on specific assets, this invention avoids the limitations of existing models that either lock tokens to individual assets, making them non-fungible, or lack a structured redemption and detokenization process, forcing reliance on third parties. The system's specialized modules enable digital currency to function independently of any single asset while maintaining verifiable backing through tokenization, minting, redemption, and detokenization. Without an integrated mechanism to restore real-world value upon exit, other models either compromise fungibility or depend on intermediaries. In this system, users retain both liquidity and asset-backed stability, ensuring that the digital currency remains scalable, adaptable, and trustless. All state changes, are recorded in an immutable ledger, ensuring transparency, consistency, and verifiability.

Fungibility: The digital currency in this system is fully fungible, cryptographically validated, and interchangeable within the digital ecosystem. It is implicitly backed rather than explicitly collateralized, meaning it is not tied to specific asset tokens but is regulated through conversion and redemption ratios, which ensure that every unit minted corresponds to a structured redemption path through asset token reinstatement and detokenization. These ratios govern minting, redemption, and detokenization and maintain synchronization between circulating digital currency and the underlying tokenized asset pool, ensuring systemic stability. Digital currency within the system may be directly backed by reserve pools, verified assets, or structured tokenized representations, enabling stable unit valuation.

Abstract Representation of Underlying Assets: In the present invention, an "abstract representation" refers to a digital construct that encapsulates attributes, characteristics, or derived metrics of an underlying asset without conferring direct ownership, possession, or enforceable legal rights. Such digital constructs serve as functional, symbolic mechanisms that enable automated transactions, interactions, or other system operations based on the asset's defined properties. Unlike traditional tokenization models that explicitly tie tokens to ownership rights, the present invention utilizes abstract representations to encode monetary value, economic utility, or functional attributes, ensuring seamless use in financial transactions without legal entanglements. Such constructs may be stored in data structures on-chain or in secure databases, hashed for immutability, and linked to specific asset identifiers or user accounts.

Security and Stability Through Implicit Backing: The invention ensures value stability through a cryptographically verified, implicit asset-backed structure. While the digital currency remains fully fungible and independent of any specific asset, its overall stability is maintained through the continuous ability to redeem it for asset tokens. This design removes reliance on external reserve audits or third-party custodians, instead leveraging a verifiable, deterministic process that autonomously preserves the system's integrity. Programmatically, the system enforces redemption checks at the smart contract level, requiring cryptographic proof that the redeemer holds sufficient currency or asset tokens to release the pledged asset.

Dynamic Valuation and Arbitrage-Driven Stability: The invention incorporates a dynamic valuation mechanism that adjusts the supply of digital currency in response to real-time market conditions. By maintaining a separation between asset tokens and digital currency, the system enables asset owners to capitalize on price differentials between the tokenized asset value and the cryptocurrency price through an embedded arbitrage mechanism. In some embodiments, computing nodes can autonomously execute contract functions, such as [autoMintAndSell], based on predefined conditions set by asset owners. When oracles detect specific price thresholds, these functions trigger automatic adjustments, ensuring real-time equilibrium between supply and demand.

Implicit Proof of Asset Reserves through Arbitrage-Driven Equilibrium: This invention ensures real-time verification of asset reserves without reliance on third-party custodians, external audits, or centralized oversight. Unlike systems requiring manual attestations, this approach continuously confirms asset backing through arbitrage. Minting and redemption ratios define the relationship between digital currency and asset tokens, allowing market participants to restore equilibrium by profiting from price discrepancies. This mechanism inherently verifies both asset existence and valuation, as the exchange rate between digital currency and asset tokens reflects market confidence in real time. Unlike speculative algorithmic stablecoins, which fail under extreme volatility, this system maintains stability by anchoring arbitrage to real-world asset values through deterministic smart contracts. Since this process is fully automated and market-driven, it provides trustless proof of reserves, ensuring systemic balance without the need for external validation. This transactional verification operates as a 'vote of confidence' in the underlying assets' value, as the exchange rate between the digital currency and asset tokens becomes a real-time reflection of this confidence.

The described outcomes have not been previously achieved within this context due to the unique synergy of modular tokenization, dynamic valuation, automated minting, redemption, and detokenization, all enforced by deterministic code on a distributed ledger. The system enables the creation of a fungible, flexible, and secure digital currency that remains backed by real-world assets while functioning as a true medium of exchange executed via computing nodes and deterministic, on-chain processes. This is accomplished without requiring third-party control, custodianship, or intermediation. Each of these benefits directly arises from the technical embodiments described below, ensuring that the system operates autonomously while maintaining verifiable asset backing with seamless integration. By leveraging distributed ledger consensus protocols, each transaction is validated, ordered, and recorded, ensuring an immutable audit trail of all asset-backed operations. Each of these benefits are the product of the embodiments below.

Overview of System Modules and Lifecycle

FIG. 1 illustrates a flow chart outlining the system-driven methods and processes integral to this invention. The system operates on a computer network, such as a set of host nodes implementing blockchain-based distributed ledger technology. The first step in the process is asset tokenization, where asset tokens are created to represent the underlying assets (see 100, FIG. 2). These asset tokens function as utility tokens, enabling the minting of digital currency (see 101, FIG. 3). Once minted, the digital currency becomes operational and can be transferred between user accounts or wallets using distributed ledger technology (see 102, FIG. 4). Digital currency in circulation can be redeemed to generate asset tokens (see 103, FIG. 5), allowing the underlying assets to be reinstated. This conversion occurs when digital currency is redeemed, recreating asset tokens linked to the underlying assets in the asset token account. The cycle completes when all asset tokens are either detokenized or burned (see 104, FIG. 6). If the total number of asset tokens matches the originally issued amount in step (100), the underlying assets are released from their pledge or encumbrance. FIGS. 2 through 6 provide detailed illustrations for each phase of the process, including both the preferred and alternative embodiments described below.

Tokenization of Assets

Figure 2:
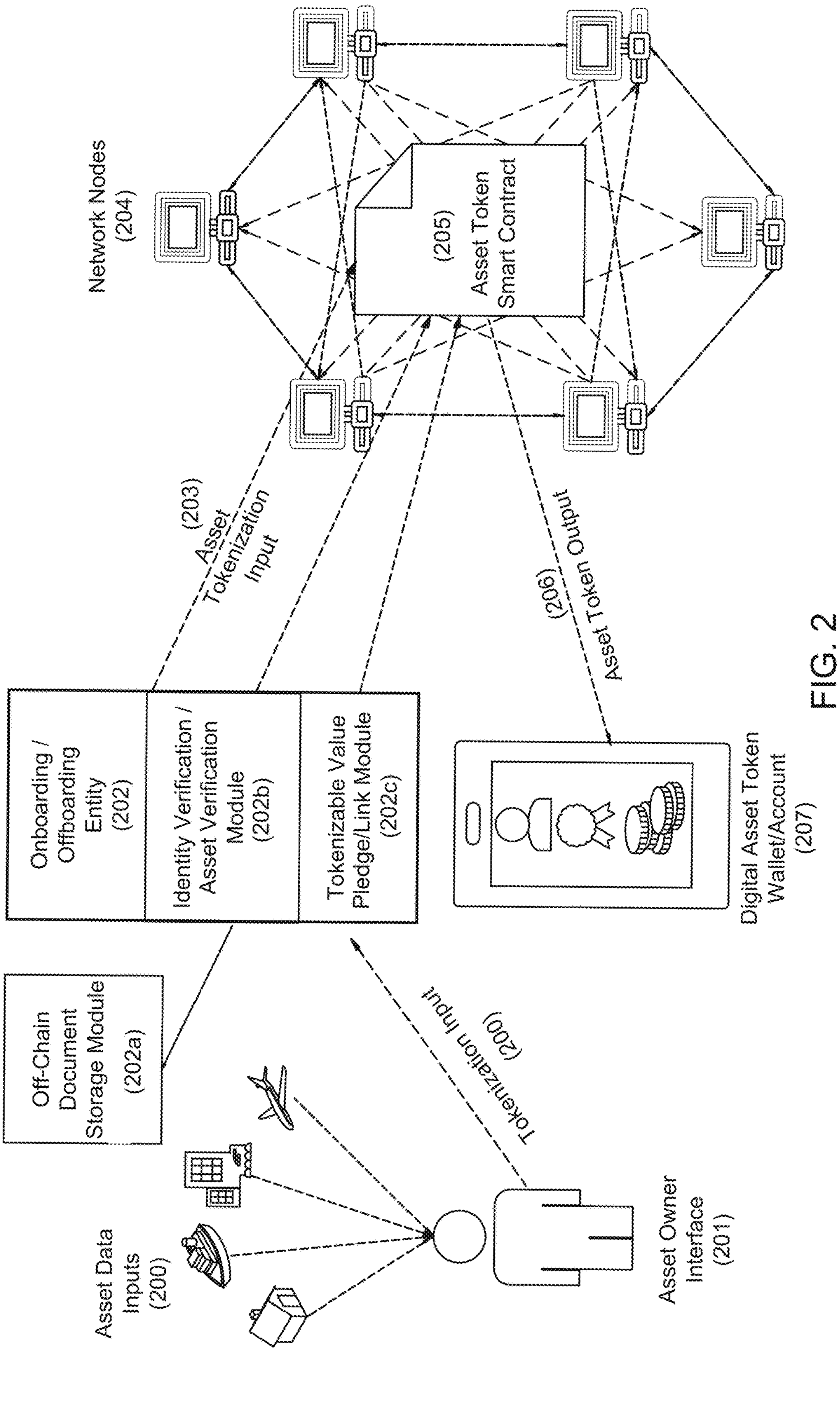
FIG. 2 is a flow diagram of an example system-executed process for preparing assets for tokenization.

In a preferred embodiment, as illustrated in FIG. 2, the onboarding of assets (200) for tokenization is an automated, structured, and trustless process that ensures asset integrity, ownership verification, and valuation (tokenization value) before generating digital asset tokens. This process leverages smart contracts, (205) integrated compliance mechanisms, and external validation sources, such as oracles, financial databases, government agencies, or trusted institutions, to ensure trustless execution (202). Automation is achieved through predefined smart contract logic that processes asset data, enforces compliance, and generates tokens based on verified parameters. Smart contracts can be customized and deployed for specific asset classes, such as real estate, financial instruments, or commodities, to align with asset specifications, risk profiles, and regulatory requirements. The onboarding process applies to both existing assets and newly issued financial instruments, with tokenization enabled after smart contract deployment.

In certain embodiments, asset tokens can represent a variety of financial instruments and possess multiple functional attributes, making them adaptable across different economic applications. For example, company stock issued as asset tokens may serve as ownership units, conferring direct equity rights, voting mechanisms, enabling token holders to participate in corporate governance, utility tokens, facilitating the minting of digital currency within the system; or corporate action participants, granting eligibility for dividends, stock splits, bonus shares, or other rights. The multifunctional nature of asset tokens allows them to serve financial, governance, and operational roles while maintaining compliance with programmable smart contract conditions. The system's modular structure enables issuers to configure tokens based on predefined governance conditions, supporting fungible and non-fungible attributes depending on the economic and legal framework of the asset.

One preferred embodiment of asset tokenization utilizes a universal smart contract structure to enforce consistent tokenization rules across all transactions. Unlike conventional tokenization systems that require asset-specific contracts, this implementation uses a single contract structure (205) where only the tokenizable value of each property is required. A representative transaction record of a smart contract deployment for XYZ real estate tokenization is as follows:

Transaction Type: Smart Contract Deployment
Contract Address: 0xCA5F0B7C9E12D8A4F1B6E34-C7D- 8A9F3B2C4D6E7A
Creator: XYZ Real Estate Company
Timestamp: Feb. 6, 2027, 12:00 UTC
Blockchain: Implemented on a public, private, or hybrid ledger
Gas Used: 2,000,000
Transaction Hash: 0xD4A9F3B2C4D6E7A5A3F0B7C9-E12D8A- 4F1B6E34C7
Storage Reference: ipfs://QmXyT9F2D4G6H8J3K5-L7M9N2B1C0A3E4F7D6E8C9

Contract Parameters:
Jurisdiction: Based on governing regulatory framework
Currency: Fiat or Digital Asset (Jurisdiction Dependent)
Tokenization Ratio: 1:1 (No leverage)
Property Type: Residential single dwelling
Pledge Requirement: Asset tokens must be detokenized before release.
Verification Authority: Recognized land and title registry per jurisdiction.
Asset Registry: A secure land registry interface and legally recognized title records system.
Regulatory Compliance: In accordance with applicable property tokenization and financial regulatory requirements within the governing jurisdiction.

Each residential dwelling undergoes the same contract execution process, ensuring uniformity, scalability, and legal compliance across all transactions. The tokenizable value is the only variable input, while the smart contract governs all subsequent operations, including regulatory validation, immutability of pledged assets, automated detokenization upon settlement, and enforcement of property-specific compliance statutes. By eliminating the need for manual property-specific contract customization, this approach significantly reduces administrative complexity, improves transaction efficiency, and ensures a legally robust real estate tokenization framework applicable to all single dwelling real estate assets. Underlying ledger updates confirm each property's pledge status, storing cryptographic references on-chain.

Asset onboarding and tokenization, as illustrated in FIG. 2, follows a structured and automated process designed to ensure ownership verification, valuation integrity, and trustless execution. The process begins when an asset owner (201) submits an asset tokenization request through a decentralized application, web interface, or smart contract-enabled platform. This request includes identity verification data, asset details, ownership proof, and pledge duration parameters. Upon submission, the system initiates a verification process to validate the owner's identity and the asset itself through a secure and automated framework (202*a*). All actions are monitored by computing nodes that verify the transaction's signature and confirm the authenticity of the data before proceeding.

Identity verification and attestations are performed using decentralized identity protocols, Know Your Customer compliance checks, and Anti-Money Laundering mechanisms to establish the legitimacy of asset ownership. On-chain attestations provide cryptographic proofs without exposing personal data, ensuring compliance with legal and financial regulations while maintaining privacy. To preserve data integrity and prevent unauthorized modifications, the verification report undergoes cryptographic hashing using SHA-256 or Keccak-256 for instance. The resulting hash serves as a unique identifier for the verification document, ensuring that any attempt to alter the content results in a completely different hash, making tampering immediately detectable. This hash is then recorded onto the blockchain by at least one node, creating an immutable record linking the owner's identity proof.

The identity verification report is digitally recorded and stored off-chain in structured formats such as JSON, XML, or PDF within decentralized storage systems, including IPFS, Arweave, or institutional repositories. The system then records the cryptographic hash on-chain within a smart contract, serving as an immutable reference to the off-chain verification report. This enables future validation by recomputing the hash and comparing it with the immutable blockchain record. Any node on the network can thus confirm the integrity of the verification report without handling personally identifying data.

The on-chain transaction associated with the identity verification event contains an identity hash identifier, a verification hash, a timestamp, a verifier identifier representing the Know Your Customer or Anti-Money Laundering provider, and a storage reference linking to the full verification document stored off-chain (202_b_). As an example, an identity verification event may contain an identity hash identifier of 0xA7C23F68B92D4E7, a verification hash of B6E7C8D3A9F5B2C4D6E7A9B2C3D4E5F6A7B8C9D0-E1F3A2B1C0, a timestamp of 2025-02-06T12:00:00Z, a verifier identifier corresponding to the Know Your Customer or Anti-Money Laundering provider, and a storage reference of ipfs://QmXyT9F2D4G6H8J3K5L7M9N2B1C0A3E4F-7D6E8C9. Miners or validators simply include this data in the next block, finalizing the record under the consensus protocol.

Once identity verification is complete, the system proceeds to asset validation to confirm the authenticity, provenance, and ownership of the asset. For real estate assets, verification is conducted by cross-referencing land title records, government registries, and independent property assessments. Financial oracles and institutional databases are used to ensure the legal and financial legitimacy of the asset. Where necessary, certified appraisers, surveyors, or auditors conduct physical inspections to confirm the asset's condition and existence. The validated data is then hashed and stored on-chain, linking the asset to the verified owner's identity hash.

To ensure precise identification of each asset, the system records globally recognized identifiers associated with the asset class. Real estate assets are linked via title or deed numbers recorded with land registries; vehicles through their Vehicle Identification Number (VIN); manufactured goods by serial numbers; aircraft via tail numbers; and securities through their International Securities Identification Numbers (ISINs). These identifiers are recorded in both off-chain verification reports and on-chain smart contracts, enabling secure traceability, regulatory compliance, and validation of asset authenticity across jurisdictions. Where available, identifier validation is performed through automated API integration with official registries, ensuring real-time authentication and minimizing manual verification errors.

The asset verification report is stored off-chain in a decentralized storage system, and a cryptographic hash of this verification report is generated and recorded on-chain within a smart contract to ensure immutability and prevent tampering. The on-chain transaction associated with the asset verification event contains an asset identifier, a verification hash, a timestamp, a verifier identifier representing the appraiser or financial institution, and a storage reference linking to the full verification document stored off-chain (202_b_). As an example, an asset verification event may contain an asset identifier of 0xF73A92B68E34D7, a verification hash of 5F8A9D34E7C2B1A6D7F- 08E34C7-D8A9F3B2C4D6E7A9B 2C3D4E5F6A7B8C9D0E1F, a timestamp of 2025-02-06T12:00:00Z, a verifier identifier corresponding to the appraiser or financial institution, and a storage reference of ipfs://QmZbT6G4b9A. Thus, any node can quickly confirm the authenticity of the asset validation.

The system ensures that all verification data, including identity and asset validation, is securely recorded and cryptographically verifiable. Any entity requiring confirmation of ownership or asset status can retrieve the recorded hashes from the blockchain and verify authenticity by recomputing them from the original verification reports. This process preserves privacy by ensuring that only hash outputs, not raw verification data, are compared, preventing exposure of sensitive information. This ensures a high level of trust, integrity, and auditability with minimal manual intervention.

Once verification is complete, the system assigns a tokenizable value to the asset (202_c_). This value is determined based on financial and non-financial metrics, including market conditions, risk adjustments, pledge duration, and liquidity considerations. The system applies an automated risk-adjusted valuation model that accounts for volatility and exposure risks. In this case, a 25% risk buffer is applied to the market value. The tokenization ratio (a parameter set as part of the smart contract in this case 1:1) is then established to define how many asset tokens can be minted from the verified tokenizable value (203).

Asset Market Value: $100,000

Risk Buffer Adjustment (25% Maximum Loss Exposure): −$25,000

Tokenizable Value: $75,000

Tokenization Ratio: 1:1 (No leverage)

Total asset tokens minted: 75,000, after accounting for price volatility and exposure risks.

In another embodiment where full asset backing is required, Value at Risk (VaR) and other statistical models can be employed to calculate maximum potential losses over the pledge period, with an additional buffer for extreme market scenarios. This ensures that asset-backed tokens remain fully backed at all times. Conversely, tokenized financial instruments, where the tokens themselves represent the financial assets (such as bonds, treasuries, commercial paper, financial derivatives, or stocks), do not require direct asset backing. Unlike asset-backed tokens, these tokenized financial instruments function as self-contained digital assets, maintaining inherent financial value and tradability without requiring additional risk-buffering mechanisms.

In another embodiment, the system may apply either a dynamic or static adjustment to the tokenization ratio to ensure proper risk management. For example, if an asset has a market value of $100,000 and a predefined tokenization ratio of 4:3, the implicit tokenizable value is $75,000. This ratio may be calculated dynamically based on risk factors, real-time market and asset data, and pledge duration or set as a fixed parameter in the smart contract. In this case, the tokenization ratio is dynamically or statically adjusted to apply the required risk buffer, ensuring adequate overcollateralization for price fluctuations.

In certain embodiments, the system retrieves tokenizable values from static data sources, such as pre-verified asset appraisals, historical financial records, or manually entered valuations with an embedded risk buffer.

Alternatively, the system can apply real-time data from on-chain oracles and off-chain feeds to dynamically compute the tokenizable value. This allows for automatic adjustments based on market fluctuations, risk conditions, and liquidity constraints. By integrating both static and real-time methodologies, the system ensures stability and integrity in asset-backed transactions while maintaining adaptability and flexibility across different asset types.

To formalize the tokenization process, the digital pledge agreement is executed (202*c*). This agreement encodes the tokenizable value, terms and conditions, and associated obligations and is digitally signed by both the asset owner and trustees. Upon execution, the pledge, lien, or mortgage is recorded or updated in external land registries or asset register databases, either automatically through APIs and smart contract oracles or manually where jurisdictional regulations require intervention. Asset tokens serve as functional enablers for minting digital currency, but they are never directly linked to the asset itself. Instead, the smart contract updates its internal state to reflect the pledged state, linking the asset ID to the asset token wallet of the asset owner, ensuring that ownership, obligations, and tokenization rights remain securely mapped within the system.

Following the execution of the agreement, both the pledged state and the tokenizable value are linked to the owner's on-chain asset account (207). The smart contract retrieves the pledged state from the digitally signed agreement and records it on the blockchain network. This ensures that the pledged status and tokenization parameters remain immutable, preventing unauthorized asset release until all obligations are met. The tokenizable value is also mapped to the owner's asset token wallet, defining the maximum amount of asset tokens that can be issued as per the pledge agreement. Example smart contract record for pledged asset state:

Owner Account: 0xB3F27A9C48E5D6A1F702C3D9E8-A5B- 4C6D1E7F98B

Tokenizable Value: 75,000 Asset Tokens

Pledge State: Active

Verification Hash: 0xF9D8A7B6C5E4D3A2B1C0987-654F3210- EDCBA9876

Timestamp: 2025-02-06T12:00:00Z

Once the pledge is fully recorded, asset tokens are minted based on the tokenization ratio. In this illustration, a non-leveraged ratio is assumed, maintaining a 1:1 relationship throughout. The smart contract enforces predefined rules, ensuring that asset tokens are issued only up to the approved tokenizable value. Once these parameters are recorded on the blockchain, either the contract owner or the asset owner may initiate the minting process via the interface/wallet, subject to the system's permissioned rules and governance conditions.

The minted asset tokens are then transferred (206) to the owner's digital wallet on the network, where they can either be used to mint digital currency if the asset token functions as a non-transferable operational token or in another variation, be traded within the system if the asset token is designed to be transferable and operational for certain asset types and/or use cases. Example blockchain token issuance event:

Smart Contract Function Call: mintAssetTokens (75000, 0xB3F27A9C48E5D6A1F702C3D9E8A5B4C6D1E-7F98B)

Transaction Hash: 0xA4F1B6E34C7D8A9F3B2C4D-6E7A5A3F0B7C9E12D8A

Minted Tokens: 75,000 Asset Tokens

Assigned Wallet: 0xB3F27A9C48E5D6A1F702C3D9E-8A5B4C6D1E7F98B

Timestamp: 2025-02-06T12:00:00Z

Node operators validate the transaction (204), and once included in a block, the tokens become visible to the owner's wallet interface.

In another embodiment, the tokenization ratio for each asset class can be dynamically adjusted based on risk parameters, liquidity conditions, and system-defined constraints. For example, a 1:4 leverage ratio results in four asset tokens being issued for every unit of tokenizable value, increasing liquidity while maintaining asset backing. Conversely, a 2:1 deleverage ratio may be applied in more conservative settings, requiring two tokenizable units to issue a single asset token.

In certain embodiments, governance proposals may modify tokenization ratios dynamically, subject to predefined constraints. Governance participants, including asset owners and network validators, may vote on adjustments based on economic conditions, liquidity requirements, or risk management considerations. Any modifications to the tokenization ratio must comply with predefined smart contract logic, ensuring that systemic integrity is preserved and preventing excessive leverage or dilution beyond established thresholds.

In another embodiment, a government-backed entity may issue tokenized financial instruments, such as bonds, where the asset token itself serves as the instrument, eliminating the need to tokenize an underlying asset. The entity deploys a smart contract configured with a unique hexadecimal identifier and metadata specifying the bond details. Upon deployment, the smart contract records a transaction hash, confirming its existence on-chain. Example smart contract issuance event for a government bond:

Contract Identifier: 0x5A3F0B7C9E12D8A4F1B6E3-4C7D8A9F3B2C4D6E7A

Transaction Hash: 0xD4A9F3B2C4D6E7A5A3F0B7C9-E12 D8A4F1B6E34C7

Validation nodes confirm the contract creation, linking it to the official issuer's address, ensuring immutability and verifiability within the blockchain network.

The entity publicly verifies the issuance through an official press release or a dedicated website. As investors purchase the bond in minimum denominations using their asset token wallets, the smart contract processes the payment and autonomously mints a bond asset token upon receipt of a digital currency payment. If a 1:1 tokenization ratio is applied, each dollar received results in the issuance of a bond asset token with a principal value of one dollar. The contract logic ensures that every payment automatically triggers a corresponding token mint event, directly linking it to the originating smart contract rather than an underlying bond asset.

The smart contract enforces automated financial transactions, including coupon payments. These payments are executed using cryptographic digital currency, transferring coupon payments directly from the issuer's account to asset token holders. This eliminates third-party intermediaries and ensures an efficient, trustless system. Periodic triggers within the smart contract can automatically transfer funds at predefined intervals, referencing an internal schedule stored in the contract's state. Automatic detokenization occurs after preconditions such as when bonds mature and final coupon and principal is paid.

In another embodiment, financial derivatives such as stock options are tokenized using smart contracts. The tokenization process explicitly defines the relationship between an options contract, the underlying shares, and the tokenized representation, as well as enforceable trading constraints. Here, a specialized smart contract running on a distributed ledger stores the metadata (strike price, expiry date, exercise style, etc.) and ensures all operations, like exercising an option or transferring asset tokens (stock options) are cryptographically verified.

A smart contract is deployed to issue call option asset tokens for a stock, such as Company ABC. The contract is configured with parameters including an underlying share allocation of 100 shares per options contract, a fixed strike price of $345, an expiration date of 30 days, an American exercise type, and a settlement type that may be either physical or cash. The tokenization ratio 1:100 is defined as one options contract equals 100 underlying shares, meaning each options contract is represented by 100 option asset tokens. To ensure trading occurs only in complete options contracts, the contract enforces that option asset tokens may only be transferred in multiples of 100 tokens. Additionally, the smart contract logic references external oracles to retrieve real-time market data, enabling automated validation of whether an option is in-the-money or out-of-the-money at any given time.

The tokenizable value of an options contract is calculated as the Option Premium, which is determined by multiplying the Price per Share by the Number of Shares per Contract. For example, if the Price per Share is $5 (based on real-time market data) and the contract covers 100 shares, then the Option Premium is 5×100=500. This means that purchasing an options contract at this premium grants the buyer the right to buy 100 shares at the strike price of $345 per share. When a user initiates a purchase transaction, each node in the blockchain network verifies the option premium amount and ensures that the corresponding option asset tokens are minted only upon receipt of the required payment.

When a user purchases an options contract through the tokenization module, the option premium is transferred directly to the issuer's account, and the system issues 100 option asset tokens to the buyer's account, with each token representing one underlying share. The system enforces trading in multiples of 100 tokens, ensuring that each transfer corresponds to a complete options contract in accordance with the tokenization ratio. All token transfers are recorded on-chain, with updated balances visible to all participants, ensuring transparency and preventing double-spend scenarios.

The option asset tokens provide the buyer with optional exercise rights to purchase 100 underlying shares at the predefined strike price of $345. Upon exercising the option, the system detokenizes the option asset tokens and processes the payment for the shares from the option owner's digital currency account at the strike price, thereby invoking the settlement process and facilitating the delivery of shares. Ideally, these shares would be on-chain assets; however, if they exist off-chain, the system reconciles on-chain and off-chain ledger systems through automated synchronization protocols, using smart contracts to validate, compare, and synchronize balances between decentralized and centralized stock settlement records. This ensures that decentralized transactions align with centralized stock settlement and registry records. This automated reconciliation eliminates delays associated with legacy clearinghouses and manual trade reconciliation.

To eliminate counterparty risk, where the underlying stock is already in the form of a tokenizable asset on-chain, an options issuer or writer may be required to borrow the underlying stock and lock the asset tokens before option asset tokens can be issued. This is enforced as a governance requirement within the smart contract, which prevents the issuance of stock option asset tokens unless the underlying shares are fully staked. This ensures that upon exercise, the stock asset tokens are readily available for transfer to the option holder, enabling instant settlement without custodians or clearinghouses. By automating the full lifecycle on-chain, this system significantly reduces operational overhead, eliminates most settlement risks and intermediary costs, ensures real-time finality, and enables frictionless global trading without geographic restrictions or delays.

Collateralization and margin settlements are executed in real-time, ensuring that derivative contracts such as futures, options or swaps are only entered into when collateral has been staked and margin requirements are met. Margin adjustments occur through automated transfers of digital currency between accounts, eliminating manual margin calls. If a margin deficiency arises due to insufficient funds, the system automatically settles the account by liquidating the collateral (unpledged state) and transferring the proceeds to the counterparty seeking payment.

This process constitutes a detokenization event, bringing obligations to a close and ensuring that all claims are fully settled on-chain and/or off-chain. This trustless, smart contract-enforced mechanism removes counterparty risk, eliminates settlement delays, and ensures continuous market stability.

If cash settlement is chosen, the difference between the strike price and the current market price is paid by the issuer in digital currency to the buyer. If the option expires out of the money (i.e., becomes worthless), the system automatically detokenizes the option asset tokens, ensuring that no unused tokens remain active after expiration. Throughout these operations, the smart contract autonomously verifies the user's signature, ensures that the exercise expiry date has not passed, and updates the on-chain records to reflect either a physical or cash settlement event.

The smart contract autonomously processes payments, transfers the premium to the issuer, and issues tokens to the buyer without manual intervention. This automation eliminates the need for external settlement, custodianship, back-office processing, contract confirmations, or reconciliations, thereby ensuring efficiency and trustless operation. Additionally, this design supports far greater scalability by allowing the system to efficiently handle high transaction volumes with minimal incremental cost, thereby reducing operational complexity and enabling substantial cost savings for all participants in the ecosystem. Because the contract code is deterministic, each node executes the same logic and arrives at an identical state, ensuring an immutable record of each derivative transaction.

The option asset tokens also serve as utility tokens, enabling holders either to exercise the option upon maturity or to trade the tokens on the open market. Settlement occurs either through the delivery of the underlying shares or via cash settlement, depending on the smart contract's configuration. This embodiment is provided as an example and other configurations are possible.

Wallets

In the preferred embodiment, digital asset token wallets serve as an interface with functionalities and rules governed by a smart contract. This wallet, in conjunction with the smart contract, interacts with the network, which validates and broadcasts transactions. Key functionalities include the storage of cryptographic keys, both private and public, which are essential for accessing digital asset tokens, signing transactions, and establishing ownership. The wallet further facilitates the minting of digital currency based on the available balance of asset tokens, provides digital asset token balance inquiries, and enables user interactions with various functions, including detokenization to conclude obligations or facilitate asset release. Each wallet implementation can be realized via software libraries that handle key management, transaction creation, and secure message signing, ensuring only the owner can initiate critical operations.

In the preferred embodiment, each user has two distinct types of wallets; however, a single wallet incorporating both functionalities may also be employed. In the dual-wallet structure, one wallet is designated for digital asset tokens representing pledged assets, while the other is dedicated to digital currency. These wallets store cryptographic keys, including a private key required for signing transactions and proving ownership, and a public key for verification. By interacting with smart contracts and the network, this configuration enhances security, particularly for the digital asset token wallet, by enabling users to keep it offline. This approach minimizes unauthorized access risks, as the asset token wallet is only required during tokenization, minting, or detokenization events. Keeping private keys offline provides significant protection against cyber threats and unauthorized transactions. Offline or "cold" wallet solutions further limit the attack surface by preventing direct exposure to the internet unless absolutely necessary for a specific transaction.

In contrast, digital currency wallets generally need to remain online or be accessible via mobile devices or browser-based wallets for regular transactions. Users can create multiple wallets and distribute balances across different accounts to mitigate potential losses if compromised. A wallet can only be at risk if an unauthorized party obtains the private key. If this occurs, the affected digital currency wallet can be abandoned, and a new one created, independent of the asset token wallet, ensuring continuity of operations. This approach mirrors the management of physical cash, where individuals only carry what they expect to use, avoiding the need to withdraw all funds in cash from the bank for daily transactions. Advanced wallet solutions can also incorporate multi-signature schemes or threshold signatures to add extra layers of security.

One of the key advantages of the invention is the structured separation between asset tokens and digital currency, providing enhanced security while maintaining user flexibility. Alternative embodiments may include different wallet configurations without deviating from the core principles of the system. For example, hardware security modules (HSMs) may store private keys for high-value asset token wallets, while software wallets suffice for everyday digital currency transfers.

Unlike digital currency, which is transferable and interchangeable between accounts within the system, digital asset tokens serve as distinct representations or partial representations of specific assets within digital asset wallets. These tokens are generally non-transferable between accounts unless explicitly configured for tradability and linked to an underlying asset or pool of assets. By default, asset tokens function as utility tokens, enabling the minting of digital currency. However, in cases where an asset token is designed to be tradable, either as a direct representation of an underlying asset or where the asset token itself constitutes the asset, alternative operational structures may apply. In such scenarios, a dedicated currency wallet may not be required, as the asset token can independently facilitate transactions and function as a unit of value. If the asset token also serves as a means for digital currency creation, a currency wallet may be introduced as needed to manage the conversion process.

Abstract Value Representation and Utility Token Functionality

Unlike conventional tokenization systems that directly represent ownership or the precise value of underlying assets, the present invention introduces a novel tokenization model based on abstract value representations. Digital asset tokens encapsulate derived attributes such as monetary value, utility, or proportional ownership metrics, representing a share of the asset's economic value, rather than serving as direct ownership claims over physical or financial assets.

These abstract value tokens function as utility tokens, allowing users to engage in various economic activities within the system. For instance, they may be programmed to trigger automated transactions, unlock financial functions, or serve as access credentials for smart contract-based services. Additionally, digital asset tokens can be utilized to mint digital currency based on predefined ratios within smart contracts. Further, they may grant governance rights, system privileges, or access to specialized functionalities embedded within the ecosystem.

By separating the tokenized representation from the fixed physical or financial attributes of the underlying asset, the system introduces several key advantages. Abstract value tokens enhance liquidity and scalability by eliminating rigid dependencies on specific asset characteristics, allowing broader applicability across asset classes. The system incorporates programmable parameters, such as market conditions, risk factors, and pledge duration, enabling dynamic adjustments to token functionality and value metrics, ensuring adaptability to different financial and economic use cases. While asset tokens do not confer direct ownership, their backing remains verifiable through a structured redemption and detokenization process, providing implicit proof of reserves without requiring external audits. This ensures the system maintains trust and transparency while operating in a decentralized environment.

This programmable abstraction transforms tokenization into a multi-layered framework, expanding its utility beyond passive asset representation. By integrating dynamic, contract-enforced functions, the invention enables new applications, including decentralized financial instruments, automated liquidity provision, and scalable digital asset frameworks.

Creating or Minting Digital Currency

Figure 3:
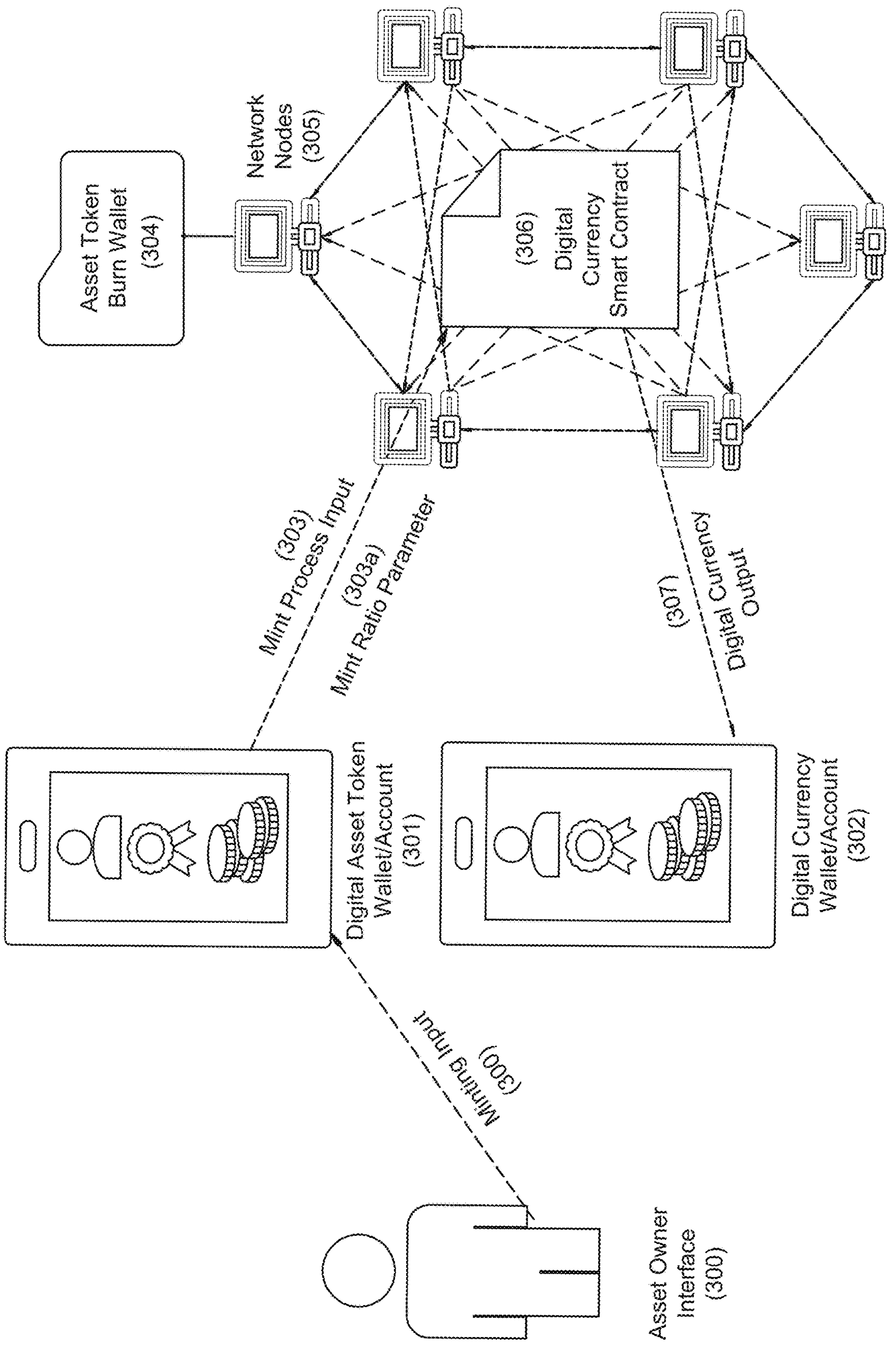
FIG. 3 is a flow diagram of an example system-executed process for minting or creating digital currency.

In reference to FIG. 3 to mint new digital and/or cryptographic digital currency, the asset owner (300) may access and utilize a new wallet for receiving and sending digital currency (302). A wallet address (can also be a scannable QR code) is derived from the public key, which is used to generate digital signatures and verify transactions. The wallet is used to receive the newly minted digital currency and to send and receive digital currency from other users.

In the preferred embodiment the asset token owner (300) returns to their digital asset token wallet (301) to invoke a request to mint (303) a specified number of digital currency units and assign them to a specific account. This functionality is executable only if there are digital asset tokens available and the request does not exceed the number of tokens available in the wallet. A smart contract function, for instance [requestMint(amount)], checks the user's balance, verifies the signature, and calculates how many currency units can be created based on a predefined minting ratio (303).

The network (305) maintains three key balances: (A): The initial issuance of digital asset tokens. (B): The current asset token balance in the owner's account. (C): The number of asset tokens detokenized (burned), allowing the asset owner to regain partial or full control of the underlying assets. The amount available for digital currency minting is calculated as (B), representing the tokens available for minting. This balance is displayed at the asset token wallet address when the network is queried. The smart contract (306) enforces minting limits using (B) and continuously updates (A-C) to calculate the remaining tokens required for complete detokenization and asset release. This ensures that digital currency issuance does not exceed available tokenized value. These balances are stored in the contract's state variables and replicated across the network ledger, allowing any node to validate minting eligibility by referencing the latest contract state and verifying past transactions if required.

Before authorizing the minting process, the system requires a corresponding burn event to be successfully executed. The smart contract verifies that a sufficient number of asset tokens have been removed from circulation via burning, staking, or freezing within the system (304). This verification is achieved through a proof-of-burn record, which includes a cryptographic hash linking the burned asset tokens to the minting request. This proof is stored on-chain to ensure no asset tokens remain active in circulation once digital currency has been issued.

When a transaction is sent to the smart contract, it is processed by network nodes, executing the code according to predefined instructions. The smart contract ensures compliance by executing the burn function, which removes the asset tokens from circulation, typically by transferring them to a designated burn address (304). The burn address is a controlled destination designed to render tokens permanently unusable. Since burning is irreversible, consensus protocols (e.g., Byzantine Fault Tolerance, Proof of Stake, or Proof of Authority) validate and finalize burn transactions on the blockchain, ensuring they are permanently recorded and immutable. The actual burning process is executed at the smart contract or protocol level, where tokens are removed from circulation or locked in an unrecoverable state.

The process of burning asset tokens is directly linked to the creation of digital currency units. When the asset tokens are burned, the smart contract simultaneously executes the minting function, generating new cryptocurrency units. These newly created units are sent to the digital currency wallet address specified by the asset token owner in the initial mint request (307). The digital asset tokens serve as a precondition for creating or minting new digital currency, ensuring that only verifiable and recorded asset-backed tokens contribute to the issuance process.

In an alternative embodiment, asset tokens may be staked instead of burned. In this case, asset tokens are committed, locked, or frozen within the smart contract to facilitate the minting of cryptocurrency. The smart contract permits the minting of new cryptocurrency only if a predefined number or ratio of asset tokens is staked. When the digital currency is later redeemed through the smart contract, the asset tokens are released back to the digital asset token wallet. The asset owner may then proceed with detokenization to reclaim their underlying asset or reuse the tokens for another minting operation. This method reduces transaction overhead by eliminating the need for re-minting asset tokens while still guaranteeing that a locked asset base supports the circulating digital currency.

Since the digital currency is decoupled from the physical asset through the use of digital asset tokens, each unit in circulation remains fungible and transferable. The digital currency is not tethered to any specific asset, but its underlying value remains implicitly backed by the structured redemption and detokenization process. This mechanism ensures that every unit of digital currency in circulation corresponds to a verifiable asset burn, stake, lock or freeze event, providing stability and maintaining financial integrity across all transactions. On-chain explorers can display the total minted currency and the corresponding utilized asset tokens for public audit, enhancing transparency and reinforcing trust in the system.

Before authorizing the minting process, the system ensures that a corresponding burn, stake, lock or freeze event has been successfully executed. When an asset owner initiates a digital currency mint request, the smart contract verifies that a sufficient number of asset tokens have been removed from circulation by burning, staking, or locking them within the system. This verification is performed by generating a proof-of-burn record, which includes a cryptographic hash linking the burned asset tokens to the minting request. The burn event is recorded on-chain, ensuring that no asset tokens remain available for new minting once their corresponding digital currency has been issued. If tokens are burned, they are permanently removed from circulation, whereas staked, locked, or frozen tokens remain held within the system until redemption or reuse. A representative proof-of-burn ledger record is as follows:

Transaction Hash: 0xC6E7A5A3F0B7C9E12D8A4F1-B6E34- D7F08E34B2C4D6

Burned Asset Tokens: 75,000 units

Verification Hash: 0xF1B6E34C7D8A9F3B2C4D6E7-A5A3F0B7C9E12D8A4 Timestamp: 2027-02-06T12:00:00Z Smart Contract Address: 0xA5F0B7C9E-12D8A4F1B6E34C7D8A9F3B2C4D6E7A Once the proof-of-burn event is successfully recorded on-chain, the system automatically authorizes the minting process, ensuring that no additional digital currency is issued beyond the verified number of burned asset tokens.

Upon successful execution of the minting process, the system generates a cryptographic proof-of-minting, ensuring deterministic asset conversion and recording of asset token utilization. This proof is stored in an immutable and verifiable ledger to prevent unauthorized token duplication, maintain transparency, and ensure compliance with smart contract rules. A representative proof-of-minting ledger record is as follows:

Transaction Hash: 0xF73A92B68E34D7C2B1A6D7F08-E34C7D8A9F3B2C4D6E7A9B2C3D4E5F6A7B 8C9D0E1F Minted Digital Currency: 100,000 units Conversion Type: Burn Verification Hash: 0xD4A9F3B2C4D6E7A5A3F0B7-C9E1- 2D8A4F1B6E34C7

Timestamp: 2027-02-06T12:00:00Z

Smart Contract Address: 0xA5F0B7C9E12D8A4F-1B6E34C7D8A9F3B2C4D6E7A

Storage Reference: ipfs://QmXyT9F2D4G6H8J3K5-L7M9N2B1C0A3E4F7D6E8C9

Any node can verify that the minted currency matches the recorded burn event, ensuring no inflation beyond the rules specified by the contract. E.g., asset token units available and minting ratios. Each proof-of-minting hash references its corresponding proof-of-burn hash, ensuring a cryptographically verifiable one-to-one mapping in the blockchain ledger.

The structured minting process follows a verifiable sequence:

(a) Receive and validate minting request—The user initiates a minting request specifying desired number of digital currency units.

(b) Verify asset token availability—The smart contract checks whether the required asset tokens exist and meet qualifying criteria.

(c) Execute token conversion operation—Asset tokens undergo burning, staking, freezing or locking as per smart contract rules.
(d) Record proof of burn—The smart contract generates a cryptographic proof linking the asset token burn/stake event to the minting request and stores it on-chain.
(e) Calculate mintable digital currency—The smart contract applies the minting ratio to determine the issuance quantity.
(f) Issue digital currency—The computed amount of digital currency is minted and assigned to the user's digital currency wallet.
(g) Record proof of minting—A cryptographic proof is generated and stored on the blockchain.

Collectively, these steps ensure every minted currency unit is fully and cryptographically backed, preventing any extraneous or unauthorized creation.

The smart contract executing the minting process ensures the prevention of unauthorized minting through deterministic, rules-based issuance mechanisms. It provides traceability and transparency, enabling regulatory compliance and public verification of asset-backed digital currency. Additionally, it guarantees auditability through cryptographic proof records, allowing independent validation of minting actions on a verifiable ledger. Implementation details can vary, but typically each validating node independently executes the same contract bytecode, ensuring deterministic minting by verifying that the recorded inputs (e.g., burned, staked, or locked tokens) exactly match the newly minted outputs before finalizing the transaction on-chain.

Transferring and Using Digital Currency

Figure 4:
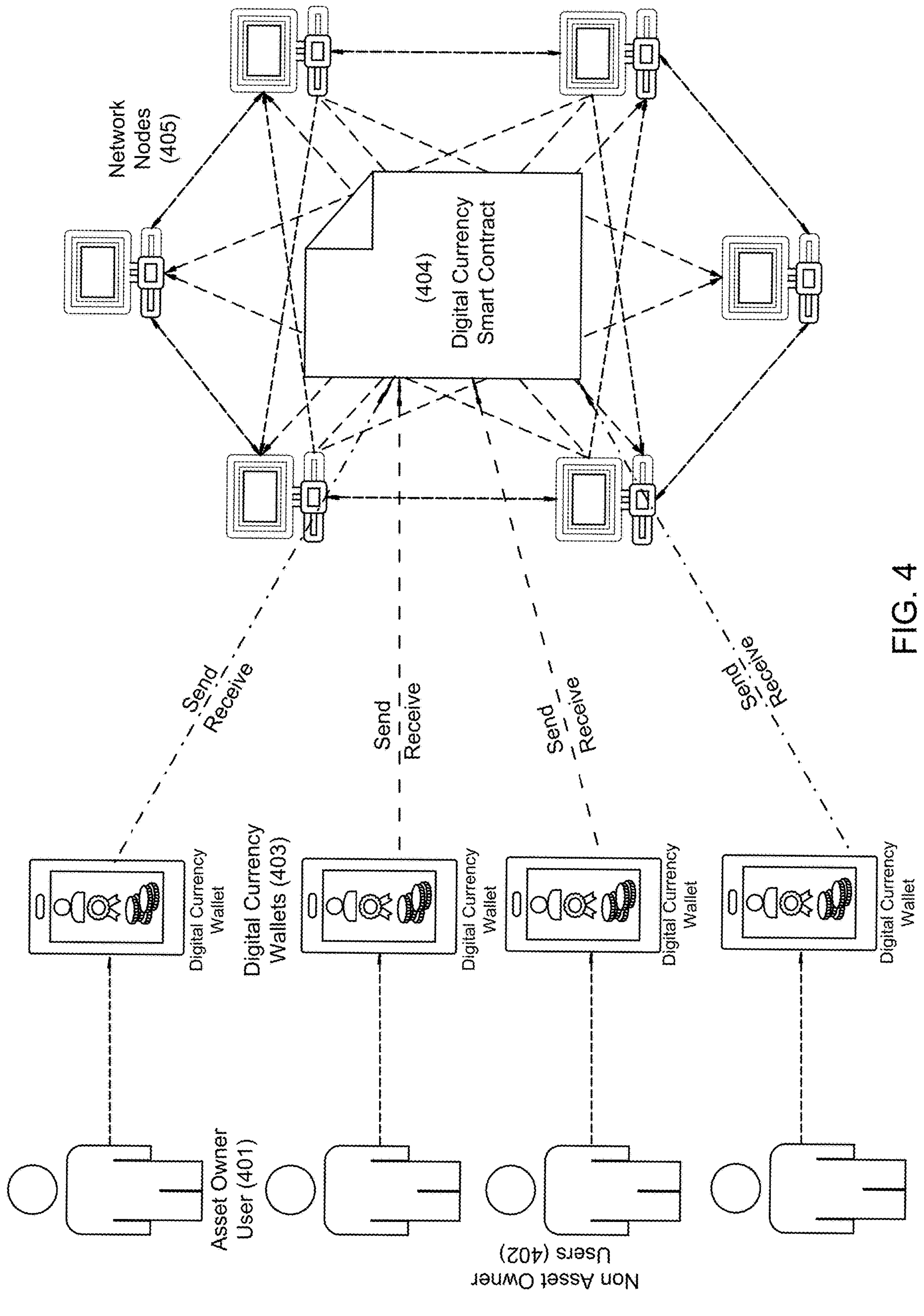
FIG. 4 is a flow diagram of an example system-executed process for receiving and sending digital currency across a network between asset owners and non-asset owners as a medium of exchange.

In reference to FIG. 4. in this aspect of the embodiment, individuals holding minted digital currency can conduct transactions to send and receive value to other digital currency holders through their digital currency wallets, extending to interactions with users who are not asset owners. Blockchain-based transaction logic ensures that each transfer is recorded in a publicly verifiable ledger, preventing double-spending.

In this preferred embodiment, a cryptocurrency wallet (403) is employed, although any software application serving the same function and interacting with the smart contract and network can also be used, including decentralized applications (dApps). Both an asset owner user (401) and a non-asset owner user (402) may initiate a transfer from their wallet by specifying the amount and the recipient's wallet address, typically obtained by scanning a Quick Response (QR) code or manually entering or copying the address. Once the user confirms these inputs, a proposed transaction is sent to the smart contract (404) for further processing under predefined rules or conditions. The final transaction is then relayed to the network, where it undergoes consensus-based validation and authorization according to predefined blockchain rules (405). Upon confirmation of the transaction's authenticity, user balances are updated, and value is transferred between wallet addresses. Each node in the network executes the transfer logic in the contract, confirming the sender's signature and ensuring the sender's balance is sufficient before updating the ledger.

The smart contract also ensures compliance with predefined security protocols, preventing unauthorized actions such as double spending, transactions originating from blacklisted addresses, or transfers exceeding predefined thresholds. Additional safeguards, including multi-signature authentication and time locked transactions, may be enforced for higher value transfers to enhance security. The smart contract may verify whether the sender has sufficient cryptocurrency to send, confirm the destination wallet's validity, and evaluate whether the transaction meets specific conditions, criteria or business logic. Digital currency wallets (403) function equivalently for both asset owners and non asset owners, serving as interfaces to initiate transactions, interact with the network, and securely manage digital currency via cryptographic methods. In some implementations, regulator nodes autonomously flag suspicious transactions in real time. Flagged transactions may be automatically blocked on-chain by the smart contract or queued for off-chain review by authorized entities. These entities may apply jurisdictional regulatory policies, compliance risk assessments, or forensic blockchain analysis before determining whether the flagged transaction is approved, reversed, or permanently restricted.

Once the transaction is validated and recorded on the blockchain, it becomes immutable and irreversible, ensuring finality. This eliminates disputes over completed transactions and guarantees that transfers remain tamper-proof and transparent, further reinforcing trust in the system. Transactions are finalized using a consensus mechanism, which may vary based on implementation. Proof of Authority (PoA) ensures regulatory compliance by allowing only permissioned validators, ensuring that only verified, legally recognized entities participate in transaction validation. This aligns with KYC/AML requirements and jurisdictional oversight.

Unlike other known digital currencies, these digital currency units remain implicitly backed by underlying assets through either their redemption into digital asset tokens or the direct release of the underlying asset pledge, as applicable. This linkage ensures that holders always maintain a stable, asset-backed form of digital currency, regardless of the type or classification of the underlying asset. This is made possible because the system establishes a common denominator via abstract representation, such as a tokenizable (monetary) value, which enables assets of different types (e.g., real estate, commodities, or financial instruments) to be standardized for seamless integration into the system. At any time, anyone can query the blockchain using network explorer tools or smart contract APIs to verify the asset backing of the digital currency, referencing the on-chain records that link minted units to previously burned or staked asset tokens.

Redeeming Digital Currency

Figure 5:
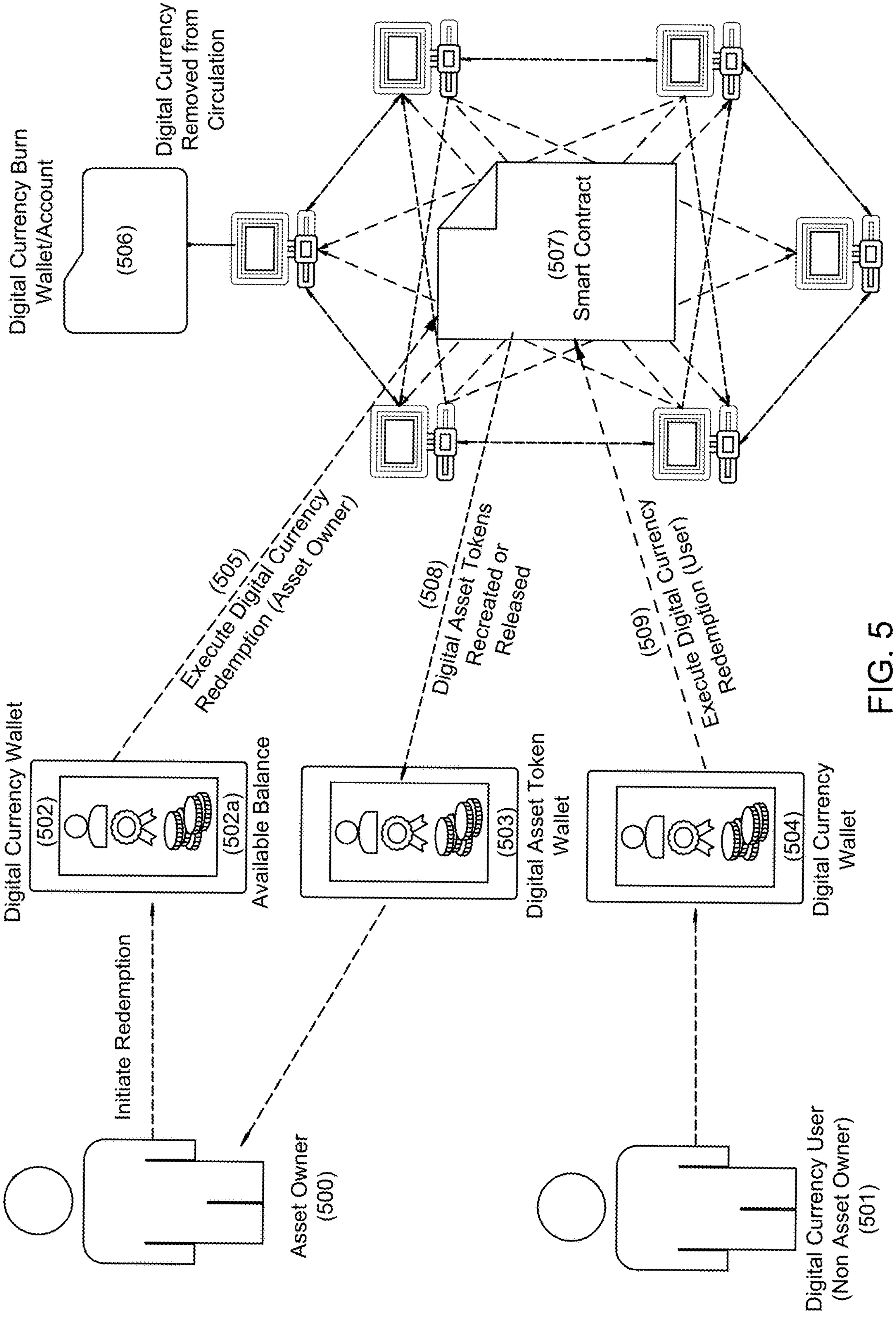
FIG. 5 is a flow diagram of an example system-executed process for redeeming digital currency back into asset tokens.

In accordance with FIG. 5, the system provides an integrated method for managing the complete lifecycle of digital currency and asset operations. The system supports two primary redemption pathways: (a) Tokenized Redemption, which replenishes asset tokens in the asset owner's account, and (b) Direct Redemption, which enables the immediate release of pledged or underlying assets when no asset tokens are involved. These redemption pathways are enforced through on-chain smart contract logic, which verifies digital currency balances before authorizing redemption, applies predefined redemption ratios to determine the quantity of asset tokens reinstated or the proportion of pledged assets released, and updates the distributed ledger via [synchronizeLedgerRecords], ensuring immutability and preventing unauthorized modifications. By eliminating intermediaries, these automated processes enable instantaneous and transparent redemption transactions. Each redemption event triggers an on-chain proof-of-redemption record, enhancing auditability and compliance with system rules.

In the preferred embodiment, user-initiated redemption occurs via secure digital wallets employing cryptographic validation. The process for tokenized redemption follows a structured execution flow in which the user (500) invokes the [initiateRedemption] function, specifying both the desired number of asset tokens and the destination digital asset token wallet address (503). The system calculates the required number of digital currency (CCY) units based on a predefined redemption ratio, using [calculateRedemptionAmount], which determines the amount of digital currency needed per asset token.

Before executing the redemption operation (505), the system verifies that the user's wallet (502) holds a sufficient digital currency balance and that the requested asset tokens do not exceed the original issuance amount. If all conditions are met, the smart contract (507) executes the redemption process. For instance, the contract function [redeemCCYTokens (CCYtokenQuantity)] computes the total redemption cost using redemptionCCYCost=CCYtokenQuantity× redemptionRatio, ensuring that the user has enough digital currency to burn before minting or releasing asset tokens.

When the underlying contractual obligation or pledge expires, the system automatically initiates the [autoRedemption] function. This applies in cases where digital currency is directly backed (i.e., without asset tokens), triggering the release of pledged or underlying assets. For example, if a user pledges real estate for 12 months, the ledger records the pledge expiration date in association with the user's digital asset token account (503). Upon expiration, the system calculates the requisite number of digital currency (CCY) units using the predefined redemption ratio via [calculateRedemptionAmount], validates the user's available balance (502), and, upon successful verification, proceeds to burn the required digital currency via [burnDigitalCurrency] (506). This automatic process releases the underlying pledge or asset and formally concludes the user's participation in accordance with the expired contractual terms.

A scheduled job or network-based trigger detects the expiration date and invokes the contract function, ensuring consistent execution across all network nodes. If the system detects an insufficient digital currency balance, the [defaultRedemption] function is triggered. This function notifies the designated trustee, regulatory entity, or assigned network participants, allowing them to take remedial action. Depending on the implementation, predefined dispute resolution mechanisms may apply, such as granting the user an additional grace period, initiating a liquidation process, or enforcing predefined contractual penalties. This ensures that obligations are resolved even if the user lacks sufficient funds, maintaining system integrity and compliance with predefined rules.

Before authorizing the redemption process, the system ensures that a corresponding burn event for the required digital currency amount has been successfully executed. When a user initiates a digital currency redemption request, the smart contract verifies that a sufficient number of digital currency units have been permanently removed from circulation by burning them within the system (506). This verification is performed by generating a proof-of-burn record using [burnDigitalCurrency], which includes a cryptographic hash linking the burned digital currency to the redemption request. The burn event is recorded on-chain, ensuring that no digital currency remains active in circulation once asset tokens have been reinstated or minted. A representative proof-of-burn ledger record is as follows:

Transaction Hash: 0xF6A7B8C9D0E1F3A2B1C0A3E-4F7D6E- 8C9B2C4D6E7A9

Burned Digital Currency: 100,000 units

Verification Hash: 0xD4A9F3B2C4D6E7A5A3F0B7-C9E12D8A4F1B6E34C7

Timestamp: 2027-02-06T12:00:00Z

Smart Contract Address: 0xA5F0B7C9E12D8A4F1B6E34C7D8A9F3B2C4D6E7A

Storage Reference: ipfs://QmXyT9F2D4G6H8J3K-5L7M9N2B1C0A3E4F7D6E8C9

Once the proof-of-redemption event is successfully recorded on-chain, the system automatically authorizes the asset token redemption process, ensuring that no additional asset tokens are issued beyond the redeemed digital currency.

Upon successful execution of the redemption request, the system generates a proof-of-redemption, ensuring deterministic asset conversion and tracking of asset token issuance or asset release. This proof is stored in an immutable ledger to prevent unauthorized token creation, maintain transparency, and ensure compliance with smart contract rules. If the redemption process involves asset tokens, the system reinstates the redeemed asset tokens to the asset owner's wallet. If the redemption involves staked, locked, or pledged assets, the system releases the corresponding assets upon successful verification of the redemption criteria (508). A representative proof-of-redemption ledger record is as follows:

Transaction Hash: 0xC6E7A5A3F0B7C9E12D8A4F1-B6E34- D7F08E34B2C4D6

Redeemed Asset Tokens: 75,000 units

Conversion Type: Redemption

Verification Hash: 0xF1B6E34C7D8A9F3B2C4D6E-7A5A3- F0B7C9E12D8A4

Timestamp: 2027-02-06T12:00:00Z

Smart Contract Address: 0xA5F0B7C9E12D8A4F1B6-E34C7D8A9F3B2C4D6E7A

Storage Reference: ipfs://QmXyT9F2D4G6H8- J3K5L-7M9N2B1C0A3E4F7D6E8C9

Each node verifies that the recorded proof-of-redemption directly corresponds to the burned digital currency amount, guaranteeing strict adherence to system-defined rules and preventing any possibility of over-issuance or unauthorized value creation. The process guarantees that asset tokens are properly reinstated, or underlying assets are released in accordance with predefined redemption conditions.

The redemption process follows a strictly verifiable sequence:

(a) Receive and validate redemption request—The user initiates a redemption request by specifying the desired number of asset tokens. Alternatively, the system may autonomously trigger redemption when the pledge period ends.

(b) Verify digital currency availability—The smart contract checks whether the required digital currency exists in the user's wallet and meets the qualifying criteria.

(c) Execute token conversion operation—Digital currency undergoes burning to trigger the recovery of asset tokens.

(d) Record proof of burn—The smart contract generates a cryptographic proof linking the digital currency burn/stake event to the redemption request and stores it on-chain.

(e) Calculate redeemed asset tokens—The smart contract applies the redemption ratio to determine the number of asset tokens to issue.

(f) Redeem asset tokens—The computed amount of asset tokens is reinstated to the user's digital asset token wallet or, if applicable, released from a staking, locking, or freezing state.

(g) Record proof of redemption—A cryptographic proof is generated and stored on-chain.

Collectively, these steps ensure that every redeemed asset token is fully backed by a previously burned digital currency unit, preventing unauthorized issuance or value inflation.

Alternatively, the system permits direct redemption of digital currency for the underlying pledge or asset without intermediary asset tokenization. In this embodiment, the user initiates redemption via a secure interface, as the system already links the digital currency to an asset ID, which may correspond to a specific asset, a pool of assets, or a reserve of assets. Digital currency within the system may be directly backed by reserve pools, verified assets, or structured tokenized representations, enabling stable unit valuation. The system burns the corresponding digital currency based on a predefined redemption ratio (e.g., 1:1 or a risk-adjusted ratio). Upon successful execution, a proof-of-redemption record is stored on-chain, ensuring auditability and finality. The system then interacts with internal or external asset registries (e.g., decentralized asset registries, property lien databases, or financial settlement networks) to update the asset's unpledged status or otherwise execute the release or return of assets linked to the digital currency on or off chain. If the update cannot be executed automatically, the system flags the transaction for manual review by designated agents, ensuring legal and regulatory compliance.

To ensure accurate and real-time updates, the system integrates with external registries through oracles or API calls from the smart contract layer, automatically verifying and executing the necessary state changes in off-chain asset records. If an automated update is not feasible, the system notifies designated trustees or agents for manual intervention, ensuring that the legal and digital status of the asset is correctly reflected in registries. This includes executing the asset's release, return, or transfer where required, whether in digital, financial, or physical form. This process guarantees that the asset is fully released and reconciled in both on-chain and off-chain environments, maintaining a seamless, verifiable, and legally compliant asset return or release.

In an alternative embodiment, when pledged assets are set to return to their original owner, such as when an individual borrows company stock or stakes a government debt security to create digital currency, the system ensures their proper return upon the expiration of the pledge period. If the company stock must be returned or the government debt security matures, the system automatically redeems the required amount of digital currency from the borrower's account and releases the underlying asset back to the original owner. If the pledged asset is locked until maturity, the system holds it until the maturity date before processing the return. Government securities are a preferred asset type in this example because they guarantee the value of the principal upon expiry, ensuring stability and predictable redemption outcomes.

This process applies to any asset used to back digital currency directly and is governed by the [autoReturnAssets] function. This function executes automatically when the pledge period expires or a predefined condition is met, as recognized by the network. If automated execution is not feasible due to the unavailability of digital currency or an inability to return the underlying asset, the system triggers a notification to trustees or designated agents for a default event or manual asset release, ensuring the redemption process is completed in all cases.

Additionally, in embodiments where asset settlement is managed off-chain, an off-chain ledger component is employed to reconcile ledger records and asset transfers. For example, in the stock borrow scenario, the underlying asset (e.g., company stock) is maintained on an offline ledger. Upon redemption of digital currency, the on-chain smart contract synchronizes with the offline ledger using secure data exchange protocols, notifying the off-chain system of the redemption event and triggering the appropriate asset transfer back to the original owner. The off-chain system ensures that all recorded asset transfers match the corresponding on-chain redemption events, preserving full traceability and auditability. This guarantees consistency across both on-chain and off-chain records, preventing discrepancies and ensuring seamless asset settlements.

Users with a digital asset token wallet can directly initiate the redemption process. Users (501) without an asset token wallet can still participate by redeeming (509) their digital currency (504) for asset tokens and directing the newly minted asset tokens to a designated third-party asset token wallet (503) belonging to another user or entity authorized within the system. However, only users who contribute assets to the system and hold an asset token wallet can redeem directly for their own account. This dual-path approach allows digital currency to function both as an asset-backed medium of exchange and as a mechanism for regulating supply and price stability. By enabling decentralized participation in asset-backed transactions and ensuring efficient liquidity flows, the system establishes a seamless and autonomous financial framework that enhances stability and scalability beyond existing asset-backed digital transaction models.

By enabling convertibility between digital currency and either asset tokens or underlying assets through functions such as [calculateRedemptionAmount], [burnDigitalCurrency], [releasePledgedAsset], [autoReturnAssets], and [synchronizeLedgerRecords], the system ensures a consistent and proportional relationship between digital currency value and asset backing. This multi-functional framework allows digital asset owners to dynamically manage supply, settlement, and redemption mechanisms in response to market conditions. By integrating automated redemption execution, ledger synchronization, and real-time tracking of asset settlements, the system enhances liquidity, maintains price stability, and improves overall market efficiency.

Price Arbitrage Methods and Regulating the Supply of Digital Currency

The system introduces an integrated arbitrage mechanism that allows asset owners to dynamically regulate the supply and demand of digital currency relative to asset tokens by leveraging price differentials between the market value of digital currency and the implied value of asset tokens. If the market price of digital currency exceeds its implied asset token value, asset owners can mint and sell digital currency, increasing supply and correcting the discrepancy, while if the digital currency trades below the asset token value, participants can purchase and redeem digital currency for asset tokens, reducing supply and restoring price equilibrium. The system does not engage in arbitrage directly but enables it as an emergent behavior based on asset-backed minting and redemption. This self-regulating mechanism ensures that the intrinsic value of digital currency remains consistently linked to its underlying asset, fostering market-driven stability without requiring centralized oversight or external intervention.

In alternative embodiments, the system automates arbitrage operations using algorithmic trading mechanisms that integrate real-time market data feeds and oracles to continuously monitor price discrepancies between the digital currency's market value and the asset token value. These operations require user wallets to hold available asset tokens, ensuring that all arbitrage activities remain fully asset-backed.

When the market price exceeds the asset token value, the system triggers an autoMintAndSell function that calculates the appropriate mint amount using a function such as [calculateMintAmount(assetValue, marketPrice)], mints digital currency via [mintDigitalCurrency(mintAmount)], and immediately sells the newly minted currency at the current market price using [executeMarketSell(mintedTokens, marketPrice)]. Conversely, when the digital currency trades below asset value, the system executes an [autoPurchaseAndRedeem] function that automatically purchases digital currency at the prevailing market price via [executeMarketBuy(purchaseAmount, marketPrice)] and redeems it for asset tokens using [redeemDigitalCurrency(purchaseAmount)].

These automated operations enable the system to respond in real time to market imbalances while maintaining strict adherence to asset-backed issuance constraints. Technical implementations may rely on a combination of off-chain arbitrage bots and on-chain triggers, with final settlements always recorded through consensus-driven mechanisms, including but not limited to blockchain-based or distributed ledger technologies. To sustain continuous arbitrage operations, the system requires a sufficient supply of asset tokens, sourced either from an existing reserve or newly issued tokens, ensuring that both minting and redemption remain fully asset-backed for seamless execution without disruptions.

In some implementations, the system enables users to define custom rules and thresholds for arbitrage activities by configuring settings within their asset token and digital currency accounts. For instance, an asset owner may set a redeem threshold to trigger an [autoRedeem] function when the digital currency's market price falls below 95% of the asset token value or a mint threshold to activate an [autoMint function] when its price exceeds 105% of the asset token value. A user-configurable dashboard or wallet interface allows participants to adjust these parameters using functions such as [setThresholds(redeemThreshold, mintThreshold)] and view real-time market data via [getMarketPrices], providing flexibility to optimize arbitrage strategies based on market conditions and profit objectives while contributing to overall system stability and efficiency. To maintain security and prevent unauthorized modifications, access control is enforced through cryptographic signatures or multi-signature (multi-sig) authentication, ensuring that only authorized users can modify arbitrage parameters.

Full or Partial Detokenization of Digital Asset Tokens

Figure 6:
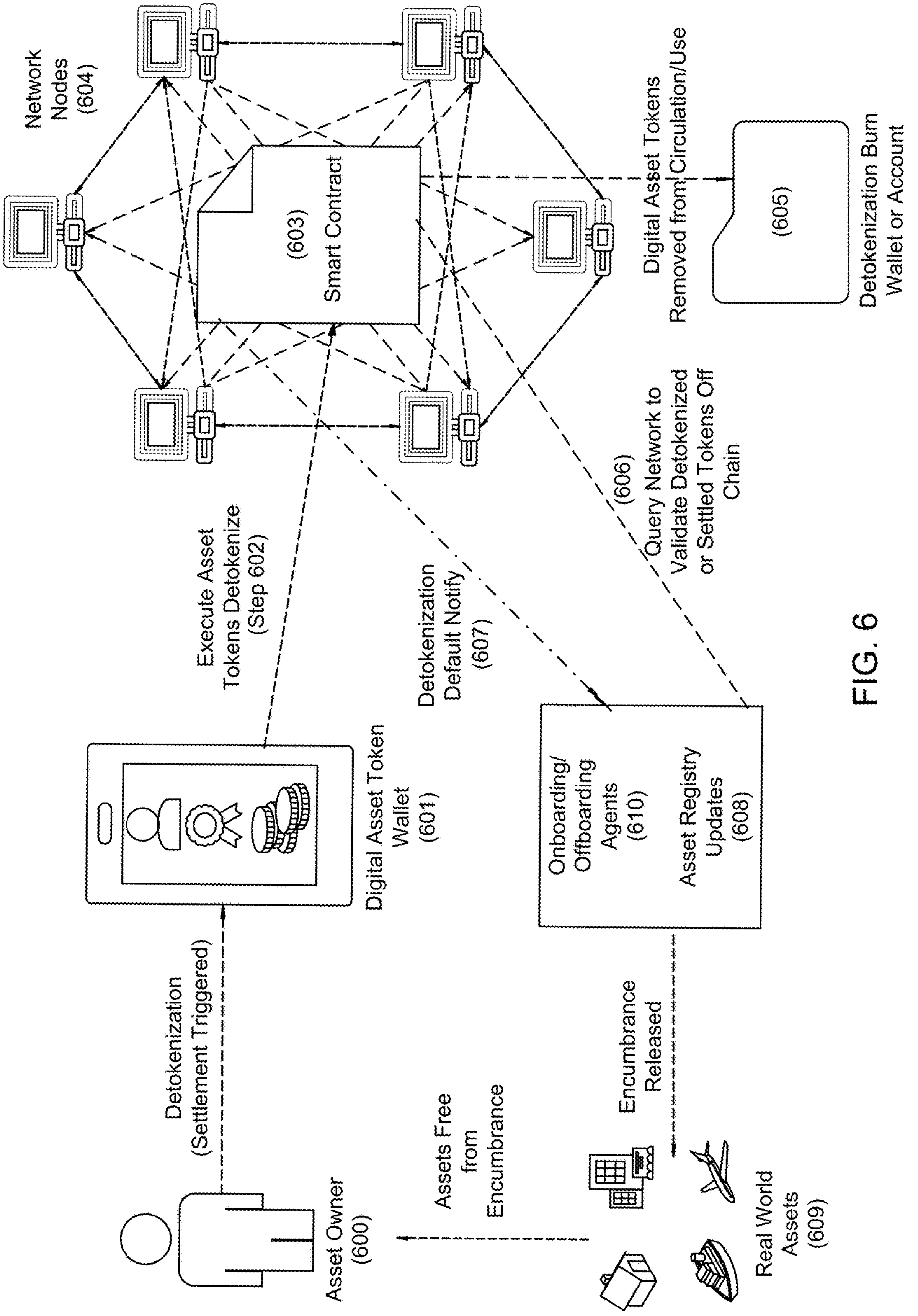
FIG. 6 is a flow diagram illustrating an example system-executed process for detokenization, which finalizes asset token obligations, ensuring the structured return of assets to their original state and concluding the digital lifecycle.
Figure 7:
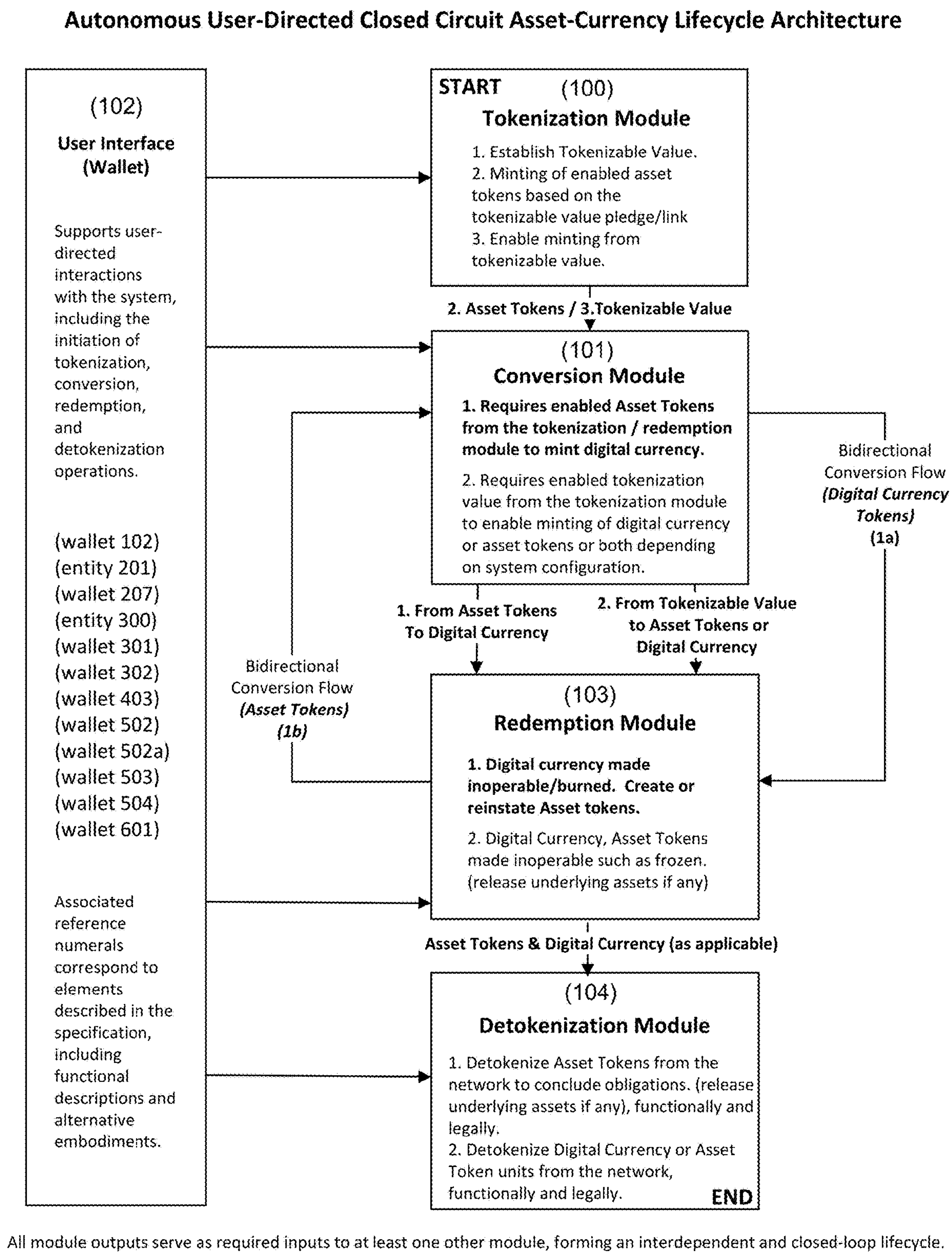
FIG. 7 is a diagram illustrating an example token lifecycle flow architecture and interdependent module relationships in accordance with one or more embodiments.

As illustrated in FIG. 6, in the preferred embodiment, detokenization refers to the computational process that converts digital asset tokens into a non-tokenized state, thereby permanently removing them from circulation and ensuring compliance with predefined conditions before any associated assets are released. Detokenization may occur either as a full transition of all tokens to an unpledged state or as a structured, incremental process where only a portion of tokens is retired, ensuring continued asset utility of the remaining asset tokens. Unlike simple token destruction, detokenization in this system is an enforced and verifiable transition of tokenized assets back to their original, unpledged form. As shown in FIG. 6, the process cancels or "burns" tokens from an asset owner's wallet under conditions such as (A) the expiration of a contractual, staking, or pledge period verified by timestamps or contract data; (B) a user-initiated detokenization request executed via a secure interface or digital wallet; or (C) compliance with regulatory, legal, or contractual requirements mandating detokenization or asset release. This process executes autonomously and securely within decentralized, centralized, or hybrid ledger environments. A specialized detokenization module, implemented via smart contracts and/or off-chain execution, ensures compliance with these conditions, preventing unauthorized detokenization and maintaining consistency between digital records and real-world asset states. Some detokenization scenarios have also been covered in the tokenisation section of this document.

In a preferred embodiment, tokens are permanently removed from circulation by executing one or more computational actions, including but not limited to burning, locking, freezing, rendering inoperable, revoking, or reversing an accounting entry. These actions ensure either the temporary suspension of tokens prior to detokenization or their final and irreversible retirement. The effects of these actions are immutably recorded on a digital ledger or through a hybrid reconciliation mechanism, ensuring that detokenized tokens remain permanently retired. Any node processing a detokenization transaction verifies account ownership, updates the contract's internal ledger to reflect the revised token status, and enforces system-defined conditions ensuring the finality of detokenization.

In another embodiment, the system supports token freezing as an intermediate step before full detokenization. This mechanism is applicable in scenarios requiring regulatory compliance, risk assessment, or contractual restrictions, where detokenization must be temporarily suspended without immediately burning, releasing, or permanently retiring the tokens. The detokenization module may execute a [freezeAssetTokens(tokenID, freezeStatus, reasonCode)] function, which prevents the affected tokens from being transferred, redeemed, or detokenized until predefined compliance conditions are met. This ensures that tokens flagged for review, such as those linked to ongoing AML investigations, regulatory audits, or pending settlement obligations remain locked but not permanently retired.

In an alternative embodiment, detokenization may include an intermediate state where tokens are temporarily restricted before final removal, ensuring compliance with system rules before permanent detokenization. During this phase, tokens may be locked, suspending operations to allow compliance checks, reconciliation, or contractual conditions to be met; revoked, disabling permissions for assets requiring regulatory approval, whitelist verification, or contractual validation before release; or subject to accounting entry reversals, adjusting tokenized asset records in off-chain or hybrid financial systems (e.g., fixed-income instruments, structured asset pools) to ensure proper reconciliation before detokenization is finalized. These mechanisms provide flexibility in managing the detokenization process while maintaining cryptographic security, regulatory compliance, and accurate record-keeping across both on-chain and off-chain environments. These mechanisms provide flexibility in managing the detokenization process while maintaining cryptographic security, regulatory compliance, and accurate record-keeping across both on-chain and off-chain environments, ensuring cryptographic consistency, regulatory alignment, and operational integrity.

The system automatically updates the ledger by executing [flagTokenStatus (tokenID, frozenStatus)], which records the suspension as a reversible state that may later transition into full detokenization, reinstatement, or an alternative compliance resolution. This freezing mechanism ensures that assets remain properly accounted for while preventing unauthorized detokenization events, maintaining strict adherence to legal and operational constraints.

The detokenization process is initiated when an asset owner (600) manually triggers detokenization through their digital wallet (601) or when a smart contract autonomously executes detokenization upon meeting predefined conditions, such as the expiration of a pledge period for user-initiated detokenization (602) or for smart contract-executed detokenization (603). A monitoring function (e.g., event listener, scheduled process, or blockchain query) continuously evaluates on-chain data to detect conditions that trigger automatic detokenization.

Upon initiation, the detokenization module executes the [validateDetokenizationRequest] function, verifying token balances, compliance with predefined conditions, and system rules. Once validation is complete, the system calls [detokenizeAssetTokens] and proceeds through a structured detokenization sequence. Initially, the system applies temporary restrictions where required, such as [lockTokens (tokenID, duration)] or [freezeTokens(tokenID)], to ensure compliance and prevent premature asset release. If all conditions are met, the system then finalizes detokenization by executing [burnTokens(tokenID, amount)], permanently removing tokens from circulation (605). Each detokenization event is cryptographically recorded to ensure that assets cannot be released unless all predefined conditions are met and validated through on-chain cryptographic commitments. The transaction details are immutably recorded in a distributed ledger using [recordDetokenizationEvent (transactionID, tokenID, detokenizationAmount)], ensuring that multiple nodes verify and confirm the operation through consensus (604). The system updates the global ledger only if all network-defined consensus rules are met, preventing unauthorized modifications while maintaining full transparency and traceability.

Each proof-of-detokenization hash references its corresponding proof-of-token-burn hash, ensuring a cryptographically verifiable one-to-one mapping in the blockchain ledger. The structured detokenization process follows a verifiable sequence:

- (a) Receive and validate detokenization request—The user (or smart contract) initiates a detokenization request, specifying the asset tokens to be detokenized.
- (b) Verify token ownership and compliance—The system verifies whether the requested asset tokens exist, are eligible for detokenization, and meet predefined governance, compliance, or contractual conditions.
- (c) Execute token retirement operation—Asset tokens are subjected to predefined detokenization actions, such as burning, locking, freezing, or revoking, based on system conditions and regulatory requirements.
- (d) Record proof of burn—The smart contract generates a cryptographic proof linking the asset token burn/revocation event to the detokenization request and stores it immutably on-chain.
- (e) Compute asset release conditions—The system evaluates whether all necessary conditions have been met for the pledged asset to transition to an unpledged state. If applicable, the system determines if partial detokenization applies.
- (f) Release pledged asset (if applicable)—Upon final detokenization, the system executes [updateAssetStatus(assetID, unpledgedStatus)], ensuring the asset is free for transfer, sale, or other use.
- (g) Record proof of detokenization—A cryptographic proof is generated and immutably stored on the blockchain. The system enforces network-wide verification through consensus (e.g., validator nodes or multi-signature approval), ensuring auditability and preventing unauthorized reversals.

Collectively, these steps ensure that every detokenization event is fully cryptographically verified, enforcing finality and preventing unauthorized asset releases or token reinstatements.

In certain embodiments, detokenization occurs incrementally rather than as a single event, enabling structured asset release aligned with periodic settlement obligations, contractual repayment structures, or phased asset unlocking schedules. The system executes partial detokenization via [calculatePartialDetokenization (requestedAmount, tokenBalance)], ensuring that remaining tokens retain their utility while allowing for structured asset disbursement. This model ensures that detokenization adheres to a predefined vesting schedule or release criteria, maintaining compliance with long-term financial agreements, staggered redemption policies, or regulatory asset disbursement frameworks.

Upon full detokenization of issued tokens, the system transitions pledged assets to an "unpledged" state by executing [updateAssetStatus(assetID, unpledgedStatus)], thereby allowing the underlying assets to be sold, transferred, or utilized without restriction. If the detokenized tokens were previously subject to legal claims, caveats, or encumbrances, the system ensures off-chain registry synchronization by first querying the blockchain ledger via [queryDetokenizationStatus(assetID)] (606). Upon verification that the detokenization event is complete, the system updates off-chain asset records through [updateRegistryOwnership (assetID, newStatus)], ensuring alignment between digital and real-world asset records. This update integrates with external asset registries and databases by referencing land title reference numbers, serial numbers, ISINs (International Securities Identification Numbers) for financial instruments, or other legally recognized asset identifiers, ensuring a cryptographically verifiable and immutable link between the detokenization process and real-world asset ownership records (608).

Additionally, the system enforces automated reconciliation with financial, legal, and regulatory registries to prevent assets from being erroneously double-pledged, misclassified, or retained in an encumbered state post-detokenization. By synchronizing with external compliance frameworks, financial reporting systems, and regulatory databases, the system ensures that the release of pledged assets is legally recognized, auditable, and immutable, maintaining full alignment with applicable financial and legal requirements (609).

If direct burning of tokens is not feasible due to legal, financial, or operational constraints, the system initiates an alternative settlement process via [alternativeSettlementProcess( )], ensuring that outstanding obligations are properly accounted for. This may involve modifying token balances, offsetting financial commitments, or converting digital asset tokens into an alternative asset representation using [convertToAssetRepresentation(tokenID, newAssetType)]. This mechanism ensures that financial obligations are fulfilled, maintaining system integrity, regulatory compliance, and alignment with asset conversion policies, while preventing disruptions in settlement workflows.

If a user lacks sufficient tokens for detokenization when a system-triggered detokenization event occurs, the system calculates the outstanding deficit using [calculateDefaultAmount(tokensIssued, tokensDetokenized)] and records the default state via [recordDefaultState(transactionID, tokenID)]. The user's account or wallet is flagged as being in default using [flagAccountDefault(userAccount, defaultAmount)], and designated trustees or external agents are automatically notified through [notifyTrustees(transactionID, userAccount, defaultAmount)], triggering liquidation procedures, collateral enforcement, or other remedial actions (607). This ensures that the system remains fully asset-backed, preventing unresolved defaults, and maintaining financial stability, risk mitigation, and compliance with governance policies.

To maintain system-wide consistency, detokenization transactions are synchronized with the broader ledger environment via [synchronizeSystemTransactions (transactionID)], ensuring that tokenization, redemption, and detokenization operate coherently across all interconnected systems. Ledger updates propagate across the network, preventing residual token balances from persisting post-detokenization unless explicitly governed by predefined reconciliation mechanisms. The ledger maintains a consistent state across all modules, ensuring that all token modifications align with reconciliation mechanisms, guaranteeing auditability, compliance, and systemic integrity.

In alternative embodiments, the detokenization process establishes secure interoperability with external legal registries, lien databases, or financial settlement networks via APIs or blockchain oracles. When tokens are retired, external systems receive real-time cryptographically signed notifications through [updateRegistryOwnership (assetID, newStatus)], ensuring secure removal of outstanding legal encumbrances. To prevent unauthorized modifications, cryptographic signatures are applied, ensuring that all registry updates remain tamper-proof, auditable, and compliant with regulatory frameworks.

If an off-chain registry update fails, the system automatically detects the failure using an exception-handling mechanism. The system raises an alert via [raiseRegistryUpdateException(assetID, registryStatus, errorType)], logs the event on-chain for auditability, and assigns the issue to a designated resolution pathway. The resolution process is determined by system configuration and may include:

(a) Automated Retry: The system reattempts the update at predefined intervals to account for temporary system failures or latency in registry synchronization.

(b) Conditional Processing Hold: If the discrepancy persists, the system places a temporary compliance hold on further off-chain registry interactions to prevent conflicts until the issue is resolved.

(c) Escalation to Regulatory Authorities: If the asset release depends on legal or regulatory approval, the system notifies the relevant entity to take action or verify the update.

(d) Alternative Reconciliation Pathways: The system may resolve the discrepancy by:

(i) Cross-checking an alternative compliance database, (ii) Engaging an external trustee for dispute resolution, or (iii) Flagging the issue for manual review where required.

Importantly, this failure does not affect on-chain detokenization. The asset is already unpledged and fully detokenized on the blockchain before the off-chain update is attempted. The registry update simply ensures that external systems correctly reflect the final status.

If predefined conditions are not met, such as insufficient tokens, expired pledges, or user inaction, the system assesses unresolved detokenization states and enforces system-wide automated restructuring. If a default condition exists (default_condition=tokens_issued−tokens_detokenized) and the expiration date has passed, the system triggers automated adjustments to system-wide parameters, token states, and compliance conditions. Cryptographically signed notifications are dispatched to designated system agents or infrastructure nodes (607), ensuring that unresolved detokenization events do not disrupt network integrity.

To enhance detokenization governance, the system may incorporate AI-driven policy enforcement for token lifecycle management. By analyzing transactional behaviors, regulatory updates, and compliance signals, AI-based governance can dynamically recommend modifications to detokenization conditions in response to real-time risk assessments and evolving regulatory frameworks. The system executes [adjustDetokenizationRules(riskFactors, regulatoryUpdates)], modifying pre-configured smart contract logic only after validation through multi-signature (multi-sig) approval, DAO voting, or governance node consensus to ensure that AI-generated adjustments comply with financial regulations, risk exposure thresholds, and market conditions. To maintain transparency, AI-driven policy changes are cryptographically logged for auditability, preventing unauthorized or unverified modifications. This approach minimizes compliance failures while preserving decentralized execution, auditability, and system-wide transparency.

To maintain transparency and decentralization, AI-driven policy changes are logged and cryptographically verified via multi-signature (multi-sig) approval, or a decentralized autonomous organization (DAO) governance vote, depending on system configuration. Consensus verification is performed by predesignated network validators, governance nodes, or smart contract-based validation protocols that assess AI-generated recommendations against predefined risk parameters and compliance policies.

The invention supports both tokenized and non-tokenized financial instruments, ensuring operational flexibility through adaptive asset conversion mechanisms, off-chain reconciliation, and automated compliance enforcement. The system dynamically accommodates structured financial agreements, phased asset releases, and hybrid reconciliation models while maintaining transparency, auditability, and compliance with predefined contractual conditions. The distributed ledger functions as the single source of truth, ensuring that asset-backed instruments transition seamlessly between on-chain and off-chain environments in full compliance with detokenization logic and regulatory requirements.

In another embodiment, detokenization may be achieved through reassignment, reclassification, or modification of asset tokens, offering a computationally efficient alternative for operational scenarios where full token removal is unnecessary. For example, if asset tokens represent commercial paper with a two-year maturity, and the underlying agreement permits a rollover extension under identical terms or as part of a new issuance, the system facilitates modification or replacement of the associated digital terms sheet or agreement. This updated agreement is then cryptographically linked to the governing smart contract or an off-chain application, ensuring that issuance, circulation, and compliance conditions remain intact while maintaining auditability and regulatory consistency.

To ensure cryptographic proof of modification, the system generates a modification commitment hash, which is recorded on-chain to establish that a permitted modification event has occurred. This cryptographic record prevents unauthorized modifications while ensuring auditability and system integrity. A modification event may include the following cryptographic identifiers:

Identity Hash Identifier: 0xA7C23F68B92D4E7
Verification Hash: B6E7C8D3A9F5B2C4D6E7A9B2-C3D4- E5F6A7B8C9D0E1F3A2B1C0

These cryptographic hashes securely reference the new or modified digital terms sheet or contract, ensuring data integrity, auditability, and non-repudiation while preventing discrepancies between off-chain agreements and on-chain records. The system autonomously extracts key contractual parameters, such as new maturity dates, issuance terms, or predefined obligations, and updates smart contract logic accordingly. To maintain system-wide consistency, all modifications undergo on-chain validation by designated governance nodes, validators, or consensus mechanisms, ensuring compliance with financial regulations and preconfigured risk-management frameworks.

The system enforces such modifications through an on-chain smart contract or an interfaced off-chain application, ensuring that the updated terms govern the lifecycle, circulation, and enforceability of asset tokens. This approach preserves asset integrity, ensures cryptographic accountability, and enhances compliance, while enabling scalable and flexible asset lifecycle management. Alternative implementations achieving equivalent functionality within the system may also be supported, ensuring adaptability across different regulatory and technological environments.

Systems Architecture

It should be understood that the operations described herein may be carried out by any processor. In particular, the operations may be carried out by, but are not limited to, one or more computing environments used to implement the method such as a data centre, a cloud computing environment, a dedicated hosting environment, and/or one or more other computing environments in which one or more assets used by the method re-implemented; one or more computing systems or computing entities used to implement the method; one or more virtual assets used to implement the method; one or more supervisory or control systems, such as hypervisors, or other monitoring and management systems, used to monitor and control assets and/or components; one or more communications channels for sending and receiving data used to implement the method; one or more access control systems for limiting access to various components, such as firewalls and gateways; one or more traffic and/or routing systems used to direct, control, and/or buffer, data traffic to components, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the method; one or more databases used to store data; one or more internal or external services used to implement the method; one or more backend systems, such as backend servers or other hardware used to process data and implement the method; one or more software systems used to implement the method; and/or any other assets/components in which the method is deployed, implemented, accessed, and run, e.g., operated, as discussed herein, and/or as known in the art at the time of filing, and/or as developed after the time of filing. In many blockchain scenarios, each node is a computing environment that runs a copy of the ledger, smart contract bytecode, cryptographic libraries, and consensus algorithms, ensuring all processes stay in sync.

As used herein, the terms "system", "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein. Accordingly, the invention can be deployed across heterogeneous infrastructures, from cloud-based server clusters to specialized on-premise hardware dedicated to running a private blockchain or consensus driven network.

As used herein, the terms system, computing system and computing entity, can denote, but are not limited to, systems made up of multiple virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted", or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party, or unknown environments, e.g., "untrusted", "trustless" environments, where such control or association is absent or decentralized. It is further understood that centralized "trusted" environments can still operate a blockchain or consensus-driven network, usually within a closed or known computing environment.

To ensure long-term cryptographic security, particularly in decentralized or trustless environments, the system can include quantum-resistant encryption methods, including lattice-based cryptography, hash-based signatures, and code-based cryptographic schemes, mitigating risks posed by future quantum computing advancements.

CONCLUSION

The system described herein provides a modular and autonomous framework for asset tokenization, digital currency (unit) issuance, redemption, and detokenization, leveraging distributed computing environments, structured execution processes, and cryptographic verification methods. As illustrated throughout FIGS. 1-6, each functional component operates through a combination of on-chain and off-chain computing interactions, ensuring secure, verifiable, and automated processing without requiring centralized oversight or manual reconciliations at every stage.

The system's modular architecture enables independent execution of key processes, including asset onboarding, verification, tokenization, and detokenization, while preserving seamless integration with distributed ledger technologies and secure financial execution frameworks. By structuring each module to operate autonomously in real time or in concert with others, the system minimizes human-driven oversight and promotes real-time, rules-based operation under various network and regulatory conditions.

Execution logic is enforced through computationally validated smart contracts, secure data transmission protocols, and deterministic processing mechanisms, ensuring repeatable and verifiable operations. This structured implementation provides bidirectional convertibility, cryptographic proof of execution, and continuous synchronization across distributed computing nodes. By eliminating manual interventions for reconciliation, the system maintains computational integrity while ensuring efficiency, security, and automated enforcement of predefined validation rules.

Unlike traditional reconciliation-based systems that rely on sequential approvals, batch processing, or centralized oversight, this framework executes autonomously in real-time through predefined computational parameters. This ensures seamless execution across heterogeneous computing environments without introducing operational latency or dependency on manual controls.

Leveraging predefined computational rules, self-executing contract mechanisms, and cryptographic validation, the system ensures consistent enforcement of operational parameters, structured data integrity, and automated state transitions. This approach improves security, reduces operational latency, and supports high scalability for diverse asset classes and transaction volumes. Through the synergy of modular execution, secure computing environments, and deterministic processing logic, the system establishes a robust, integrated framework for autonomously managing the lifecycle of digital and tokenized assets in a structured, scalable, and verifiable manner.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient or efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the system and related methods of the invention have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

The invention claimed is:

1. A computing system, comprising:

(a) a network of computing nodes configured to execute lifecycle operations of asset tokenization, conversion, redemption, and detokenization, the lifecycle operations being implementable by any combination of smart contracts, off-chain applications, backend systems, or hybrid architectures, wherein the computing nodes are configured to record entries in, update entries in, or maintain a ledger;

(b) a tokenization module, operable by at least one processor and stored on a non-transitory computer-readable medium, configured to:

(i) receive and validate asset data relating to an asset from one or more data sources, the asset data comprising valuation data, pricing data, contractual data or asset reference data, ownership data, identity verification data, or linkage or pledge data relating to the asset, and validate the asset data using system-enforced programmable integrity logic configured to evaluate data integrity;

(ii) determine a tokenizable value for the asset based on the validated asset data, using valuation data, pricing data, physical or measurable asset characteristics, external data feed ingestion, or system-configured computation logic, and record the tokenizable value in the ledger for use in subsequent lifecycle operations;

(iii) determine whether the tokenizable value is linked to, or pledged in relation to, validated underlying assets or underlying reserves represented by the validated asset data, and, where such linkage or pledge data exists, in accordance with a configuration of the computing system, determine whether minting, conversion, redemption, or detokenization is permitted based on a linkage or pledge determination;

(iv) determine lifecycle control data based on at least the validated asset data received under sub-element (i), the tokenizable value determined under sub-element (ii), and the linkage or pledge determination under sub-element (iii); determine, from the lifecycle control data and the configuration of the computing system, an operational classification designated as either category (A), corresponding to a bidirectional operation, or category (B), corresponding to a non-bidirectional operation; wherein the lifecycle control data, in combination with the configuration of the computing system, governs permitted minting, conversion, redemption, and detokenization operations and thereby establishes a lifecycle instance; and record a persistent lifecycle record for the lifecycle instance in the ledger or in a system record that is synchronized with the ledger;

and perform, based on the operational classification for the lifecycle instance, one of the following:

(v) where the operational classification is category (A), mint asset tokens associated with the validated underlying assets or underlying reserves based on the tokenizable value using a tokenization ratio, record the minted asset tokens in the ledger, and enable bidirectional exchangeability and convertibility for the lifecycle instance, including conversion of such asset tokens into digital currency units by a conversion module and redemption of digital currency units into such asset tokens by a redemption module;

(vi) where the operational classification is category (B), provide the lifecycle control data to the conversion module, wherein the conversion module operates in accordance with the lifecycle control data to mint or assign asset tokens or digital currency units based on the tokenizable value, record such asset tokens or digital currency units in the ledger, and enforce a one-way lifecycle progression for the lifecycle instance in which such asset tokens or digital currency units are not exchangeable or convertible into one another and are thereafter only eligible for redemption and detokenization in accordance with the lifecycle control data;

(c) the conversion module, operable by at least one processor and stored on a non-transitory computer-readable medium, configured to:

(i) execute a corresponding conversion operation, wherein:

(A) for the lifecycle instance classified as category (A) under sub-element (b)(iv), execute a value-adjusting operation selected from the group consisting of a burning operation, a staking operation, a freezing operation, a locking operation, and an accounting entry operation on the asset tokens minted under sub-element (b)(v), thereby placing those asset tokens into a state unavailable for reuse in any subsequent minting operation, and mint digital currency units from those asset tokens; and (B) for the lifecycle instance classified as category (B) under sub-element (b)(iv), execute a value commitment or usage operation comprising linking, allocating, committing, reserving, consuming, or exhausting the tokenizable value recorded under sub-element (b)(ii) as the basis for minting or assigning asset tokens or digital currency units, in accordance with the operational classification for the lifecycle instance, and record the tokenizable value as unavailable for any subsequent minting or assigning operation for that lifecycle instance;

(ii) compute a quantity of asset tokens or digital currency units to be minted or assigned by applying a programmable minting ratio, wherein for the lifecycle instance classified as category (A) under sub-element (b)(iv) the programmable minting ratio is applied to the quantity of the asset tokens subjected to the value-adjusting operation under sub-element (c)(i)(A), and wherein for the lifecycle instance classified as category (B) under sub-element (b)(iv) the programmable minting ratio is applied to the tokenizable value subjected to the value commitment or usage operation under sub-element (c)(i)(B);

(iii) record, in the ledger, each minting or assigning operation executed under sub-element (c)(i) together with:

(A) the corresponding value-adjusting operation under sub-element (c)(i)(A) or value commitment or usage operation under sub-element (c)(i)(B), as applicable; and (B) a resulting post-issuance state of the minted or assigned asset tokens or digital currency units after completion of the minting or assigning operation; and (iv) synchronize minting or assigning operations executed by the conversion module with lifecycle operations executed by the computing system and enforce lifecycle conditions to prevent over-minting, over-assignment, double spending, or duplication of value across the ledger;

(d) the redemption module, operable by at least one processor and stored on a non-transitory computer-readable medium, configured to:

(i) execute a selected redemption operation comprising a burning operation, a locking operation, a freezing operation, a staking operation, or a reversal of an accounting entry on digital currency units minted under sub-element (c)(i)(A) for the lifecycle instance classified as category (A) under sub-element (b)(iv), or on asset tokens or digital currency units minted or assigned by the conversion module for the lifecycle instance classified as category (B) under sub-element (b)(iv), wherein the selected redemption operation is configured to:

(A) cause the asset tokens minted under sub-element (b)(v) for the lifecycle instance classified as category (A) under sub-element (b)(iv) to be restored to an available token state, including by minting replacement asset tokens where the value-adjusting operation executed under sub-element (c)(i)(A) comprised a burning operation, or by releasing or otherwise restoring availability of previously restricted asset tokens where the value-adjusting operation executed under sub-element (c)(i)(A) comprised a locking operation, a freezing operation, a staking operation, or a reversal of an accounting entry;

(B) effect release, transfer, or settlement of the validated underlying assets or underlying reserves referenced in sub-element (b)(iii) for the lifecycle instance classified as category (B) under sub-element (b)(iv); and (C) where the asset tokens or digital currency units subjected to the selected redemption operation correspond to native on-chain assets rather than the validated underlying assets or underlying reserves, apply the selected redemption operation in a manner that transitions such native on-chain assets into a recorded state of the lifecycle instance for subsequent detokenization without releasing or affecting any of the validated underlying assets or underlying reserves referenced in sub-element (b)(iii);

(ii) apply a programmable redemption ratio to determine, for the lifecycle instance classified as category (A) under sub-element (b)(iv), a quantity of asset tokens to be restored under sub-element (d)(i)(A) based on a quantity of digital currency units subjected to the selected redemption operation under sub-element (d)(i), and, for the lifecycle instance classified as category (B) under sub-element (b)(iv), a quantity of the validated underlying assets or underlying reserves to be released, transferred, or settled under sub-element (d)(i)(B);

(iii) record, in the ledger, each redemption operation executed under sub-element (d)(i), together with the resulting token state and any corresponding asset release, transfer, or settlement state arising from execution of the selected redemption operation, thereby maintaining lifecycle consistency across tokenization operations, conversion operations, redemption operations, and detokenization operations; and (iv) synchronize each redemption operation executed under sub-element (d)(i) with lifecycle operations executed by the computing system, and enforce lifecycle conditions to prevent unauthorized, inconsistent, or duplicative redemption operations;

(e) a detokenization module, operable by at least one processor and stored on a non-transitory computer-readable medium, configured to:

(i) verify, prior to detokenization, that a required quantity of asset tokens or digital currency units corresponding to a detokenization request is available to perform a token state reversion operation under sub-element (e)(ii);

(ii) perform a detokenization operation comprising the token state reversion operation that is distinct in system architecture from redemption, wherein the detokenization operation:

(A) comprises a burning operation, a locking operation, a freezing operation, a rendering-inoperable operation, or an accounting reversal operation on the asset tokens or digital currency units corresponding to the detokenization request, thereby rendering such asset tokens or digital currency units unavailable to re-enter the lifecycle instance;

(B) enforces irreversible closure of the lifecycle instance such that asset tokens or digital currency units subjected to the detokenization operation are prevented from re-entering the lifecycle instance;

(C) where the corresponding tokenizable value is extinguished, consumed, or rendered unavailable upon detokenization, prevents re-entry of such tokenizable value into the lifecycle instance;

(D) where the asset tokens or digital currency units subjected to the detokenization operation correspond to the validated underlying assets or underlying reserves that are linked or pledged as determined under sub-element (b)(iii), enables release, in whole or in part, of the validated underlying assets or underlying reserves referenced in sub-element (b)(iii);

(E) for the lifecycle instance classified as category (B) under sub-element (b)(iv), corresponding to the non-bidirectional operation, a redemption operation satisfying lifecycle conditions for irreversible closure also satisfies detokenization for the lifecycle instance, such that redemption and detokenization occur as a merged lifecycle event, thereby prohibiting re-entry into the lifecycle instance;

(iii) record, in the ledger, each detokenization operation executed under sub-element (e)(ii), together with the resulting token state arising from execution of the detokenization operation under sub-element (e)(ii);

(f) a secure interface, operable by at least one processor and stored on a non-transitory computer-readable medium, configured to:

(i) authenticate users or authorized agents and provide access to system-maintained information comprising balances, statuses, or other data relating to lifecycle operations associated with asset tokens or digital currency units;

(ii) retrieve ledger-recorded transaction histories or system-recorded transaction histories relating to the asset tokens or digital currency units; and (iii) enable secure initiation and cause execution of tokenization operations, conversion operations, transfer operations involving asset tokens or digital currency units, redemption operations, or detokenization operations by the tokenization module, the conversion module, the redemption module, and the detokenization module, in accordance with permissions enforced by the system.

2. The computing system of claim 1, wherein the computing system is configured to process asset data representing at least one asset selected from the following asset types:

(a) real-world assets, comprising real estate selected from residential, commercial, industrial, or agricultural properties; tangible goods or commodities selected from precious metals, agricultural products, fossil fuels, mineral resources, or mineral or energy reserves classified as proven, probable, or potential reserves; and cash deposits or currency;

(b) financial assets, comprising debt instruments, equity instruments, financial derivatives, convertible instruments, hybrid securities, or digitally native instruments issued, recorded, and maintained directly within the computing system without requiring an off-chain equivalent; or (c) intangible assets, comprising intellectual property, royalties, accounts receivable, digital assets, expected future cash flows, or other contractual or legally enforceable rights or claims;

wherein at least one asset either originates outside the computing system and is represented within the computing system by the asset data, or is digitally originated, issued, recorded, or maintained directly within the computing system without requiring an off-chain equivalent.

3. The computing system of claim 1, wherein asset tokens are configured to represent digitally encoded representations of the validated underlying asset or of validated attributes of the validated underlying asset, the asset tokens being configured as at least one of:

(a) parameterized or abstracted representations of attributes of the validated underlying asset, the attributes comprising monetary, physical, statistical, contractual, or performance-related attributes, wherein the physical attributes comprise tangible characteristics of assets, goods, or objects capable of measurement, detection, or classification by the computing system;

(b) units, portions, time-based entitlements, or shares representing an economic, contractual, temporal, or system-defined interest associated with the validated underlying asset, wherein the interest comprises quantity, duration, schedule, or conditions defined by the computing system, and wherein the interest is configurable or assignable through processing by the tokenization module or a corresponding asset-specific smart contract; or (c) rights-linked or utility-linked digital representations associated with the validated underlying asset, the digital representations configured to provide authorization, control, or access to functions relating to the validated underlying asset or to enable participation in events relating to the validated underlying asset, the events comprising one or more of corporate action events, distribution processing events, reward disbursement events, or governance actions, and wherein the digital representations are further configured to undergo state changes or rule-based execution responsive to system-detected conditions.

4. The computing system of claim 1, wherein the tokenization module is further configured to derive the tokenizable value under claim 1(b)(ii) for the asset by processing the asset data using one or more valuation models, statistical models, external appraisal inputs, or system-configured parameters, wherein the processing incorporates at least one of:

(a) market risk factors or parameters comprising at least one risk sensitivity, asset correlation metric, or pricing-related risk metric, selected from the group consisting of delta, gamma, vega, theta, or rho;

(b) market pricing data or real-time market conditions comprising volatility metrics, liquidity measures, or price discovery data obtained from external data sources;

(c) third-party or externally sourced valuation or appraisal information applicable to the underlying asset;

(d) pledge duration or maturity characteristics applicable to the underlying asset; or (e) asset-specific characteristics;

wherein processing of the asset data determines the tokenizable value and records the tokenizable value in the ledger for use in subsequent tokenization operations, conversion operations, redemption operations, or detokenization operations.

5. The computing system of claim 1, wherein the tokenization module is further configured to perform one or more of:

(a) minting asset tokens for a lifecycle instance for which the operational classification is category (A) under claim 1(b)(iv), based on the tokenizable value using a system-configured tokenization ratio, and recording the minted asset tokens in the ledger;

(b) processing the asset data to determine or apply a unit of account for the asset, selected from monetary units or physical quantity units, and calculating the tokenizable value under claim 1(b)(ii) such that the tokenizable value recorded in the ledger is expressed in the unit of account;

(c) applying the tokenization ratio that enables at least one of:

(i) regulating issuance of asset tokens for the lifecycle instance for which the operational classification is category (A) through programmable leveraging, deleveraging, or value maintenance operations; or (ii) redemption of digital currency units into asset tokens minted under claim 1(b)(v) for the lifecycle instance for which the operational classification is category (A);

(d) setting a predefined pledge period for a lifecycle instance for which the operational classification is category (A) or category (B) under claim 1(b)(iv), wherein the predefined pledge period applies to at least one of the underlying asset or the tokenizable value determined under claim 1(b)(ii), including any portion of that tokenizable value allocated to the conversion module, and wherein the computing system enforces expiration, penalties for failure to redeem, or preconfigured release conditions;

(e) configuring asset tokens with governance parameters recorded in the ledger as at least one of:

(i) non-transferable or non-fungible tokens ensuring asset-specific integrity; or (ii) transferable or fungible tokens enabling liquidity, interoperability, or exchange; and (f) determining lifecycle control data under claim 1(b)(iv) and providing the lifecycle control data for use by the conversion module, the redemption module, and the detokenization module, wherein permitted minting, conversion, redemption, and detokenization operations for the lifecycle instance established under claim 1(b)(iv), in relation to at least one validated underlying asset or underlying reserve represented by the validated asset data, are governed by the lifecycle control data in combination with the configuration of the computing system.

6. The computing system of claim 1, wherein tokenization operations, conversion operations, or redemption operations are governed by one or more of the following:

(a) the tokenization ratio defining, for a lifecycle instance for which the operational classification is category (A) under claim 1(b)(iv), a relationship between the tokenizable value determined under claim 1(b)(ii) for an asset and a quantity of asset tokens minted under claim 1(b)(v), the tokenization ratio being configurable based on pledge duration, market pricing data, risk assessments, market volatility, governance conditions, or contract terms;

(b) the programmable minting ratio applied by the conversion module under claim 1(c)(ii), wherein, for the lifecycle instance classified as category (A) under claim 1(b)(iv), the programmable minting ratio defines a relationship between a quantity of asset tokens subjected to the value-adjusting operation under claim 1(c)(i)(A) and a quantity of digital currency units minted from those asset tokens, and wherein, for the lifecycle instance classified as category (B) under claim 1(b)(iv), the programmable minting ratio defines a relationship between the tokenizable value subjected to the value commitment or usage operation under claim 1(c)(i)(B) and a quantity of asset tokens or digital currency units minted or assigned by the conversion module;

(c) the programmable redemption ratio applied by the redemption module under claim 1(d)(ii), defining:

(i) for the lifecycle instance classified as category (A) under claim 1(b)(iv), a relationship between a quantity of digital currency units subjected to a redemption operation and a quantity of asset tokens restored under claim 1(d)(i)(A); or (ii) for the lifecycle instance classified as category (B) under claim 1(b)(iv), a relationship between a quantity of digital currency units or asset tokens subjected to a redemption operation and a quantity of the validated underlying assets or underlying reserves released, transferred, or settled under claim 1(d)(i)(B);

(d) synchronization logic configured to apply one or more of the tokenization ratio, the programmable minting ratio, or the programmable redemption ratio to verify value consistency across the tokenization module, the conversion module, and the redemption module, thereby verifying that token issuance, digital currency minting, and redemption are executed in proportion to one another and remain aligned with one or more system-configured ratios; and (e) governance logic permitting the tokenization ratio, the programmable minting ratio, or the programmable redemption ratio to be fixed or dynamically adjusted in response to market conditions, volatility metrics, system-defined risk parameters, or predefined governance rules.

7. The computing system of claim 1, wherein one or more smart contracts, modules, or combinations thereof are configured to autonomously enforce predefined lifecycle rules and conditions by performing one or more of the following:

(a) executing tokenization ratios, programmable minting ratios, or programmable redemption ratios to regulate issuance, reinstatement, or removal of asset tokens or digital currency units;

(b) executing burning operations, locking operations, freezing operations, or accounting reversal operations on asset tokens or digital currency units in response to user-initiated actions or lifecycle-triggering conditions;

(c) automatically initiating detokenization and transitioning the validated underlying assets or underlying reserves linked or pledged as determined under claim 1(b)(iii) to an unpledged state or an unlinked state upon satisfaction of lifecycle conditions or in response to user-initiated requests;

(d) executing predefined conditions and obligations configured in the smart contracts, comprising automated distribution of financial obligations, wherein the financial obligations comprise bond coupon payments, dividends, royalty streams, rent, financial swap cashflows, or other scheduled cashflows associated with tokenized assets;

(e) establishing, managing, and extinguishing a pledged state or a linked state of the validated underlying assets or underlying reserves using one or more digital mechanisms, the digital mechanisms comprising digital liens, digitized mortgages, digital encumbrances, or digitally represented contractual instruments, wherein the digitally represented contractual instruments comprise ISDA agreements or other contractual instruments represented in digital form, and wherein the digital mechanisms interface with at least one lifecycle module or smart contract to extract, validate, and use instrument data, enforce lifecycle conditions, and maintain the pledged state or the linked state recorded in the ledger;

(f) consuming off-chain or external data provided through authenticated oracle mechanisms, the external data comprising market pricing data, appraisal results, credit risk information, agreement status updates, or regulatory conditions, to autonomously trigger lifecycle events, enforce contractual obligations, or update the pledged state or the linked state or ledger-recorded states of asset tokens or digital currency units;

(g) utilizing a dual contract architecture comprising:

(i) a base lifecycle smart contract, or a coordinated set of smart contracts collectively configured to execute lifecycle logic, configured to encode and enforce system-wide lifecycle rules governing tokenization, conversion, redemption, and detokenization applicable across asset types processed under claim 2; and (ii) a per-asset smart contract instance instantiated for each asset or asset type, wherein asset data for the asset or asset type is received and validated under claim 1(b)(i), and wherein the lifecycle control data is determined under claim 1(b)(iv) and the operational classification is designated as category (A) or category (B) under claim 1(b)(iv), the per-asset smart contract instance being configured to store asset-specific parameters, valuation requirements, compliance conditions, pledge rules or linkage rules, valuation metadata, reference metadata, lifecycle conditions, and to maintain or reference the tokenizable value determined under claim 1(b)(ii);

wherein, upon instantiation, each per-asset smart contract instance is linked to the base lifecycle smart contract such that lifecycle operations executed by the tokenization module, the conversion module, the redemption module, and the detokenization module are governed by both:

(A) the system-wide lifecycle rules encoded in the base lifecycle smart contract or the coordinated set of smart contracts; and (B) the asset-specific parameters, lifecycle conditions, and lifecycle control data determined under claim 1(b)(iv), as encoded in or referenced by the linked per-asset smart contract instance.

8. The computing system of claim 1, wherein the network of computing nodes implements a decentralized ledger architecture, comprising one or more of the following:

(a) a blockchain-based network;

(b) a peer-to-peer system; or (c) another distributed ledger technology (DLT);

wherein the ledger is realized as a public, private, or hybrid distributed ledger, in a permissioned or permissionless configuration; and wherein the network and the ledger are further configured to perform one or more of:

(i) validating, processing, recording, and storing transactions associated with tokenization operations, conversion operations, redemption operations, detokenization operations, and transfers of asset tokens or digital currency units;

(ii) executing smart contract logic in response to submitted transactions to govern lifecycle operations;

(iii) applying one or more consensus mechanisms comprising proof-based, voting-based, or hybrid consensus protocols to validate submitted transactions, confirm transaction acceptance, and order corresponding ledger updates;

(iv) performing cryptographic validation and decentralized ledger updates to secure recorded asset token and digital currency unit states; and (v) coordinating cross-chain or multi-chain lifecycle operations, including validating cross-chain proofs, synchronizing state updates, processing bridged asset tokens or digital currency units, or recording lifecycle transitions across multiple distributed ledgers.

9. The computing system of claim 1, wherein cryptographic verification protocols and at least one of a secure software interface or a secure wallet interface, each integrated with the secure interface of claim 1 (f), are configured to authenticate user interactions, authorize lifecycle operations, and maintain integrity of ledger-recorded states of the asset tokens and digital currency units, the system being further configured to perform one or more of:

(a) employing asymmetric public key and private key cryptography, multi-signature authentication, or threshold signature schemes to authorize tokenization operations, conversion operations, redemption operations, detokenization operations, or transfer operations involving asset tokens or digital currency units;

(b) applying cryptographic authentication mechanisms comprising zero-knowledge proofs, multi-factor authentication, or quantum-resistant signature schemes, to verify user identity or transaction authorization prior to execution of lifecycle operations;

(c) providing at least one of a secure software interface or a secure wallet interface operable to:

(i) initiate authenticated tokenization operations, conversion operations, redemption operations, or detokenization operations through smart-contract interactions;

(ii) retrieve balances and transaction history for accounts associated with asset tokens or digital currency units recorded in the ledger; and (iii) interoperate with distributed-ledger systems, centralized ledgers, or custodial and non-custodial wallet implementations without modification of lifecycle logic; and (d) implementing cryptographic security mechanisms, the mechanisms comprising multi-signature authorization, time-locked transaction releases, or hardware-wallet-based or cold-wallet-based key storage to secure account ownership and transaction execution.

10. The computing system of claim 1, wherein financial data sources, compliance systems, asset verification platforms, and the ledger are synchronized through automated protocols using at least one of application programming interfaces (APIs), oracle networks, or messaging interfaces, and wherein the computing system is configured to perform at least one of:

(a) executing verification and authentication processes for user identity, ownership data, asset characteristics, registry information, encumbrance data, or the linkage or pledge data, using on-chain or off-chain verification sources;

(b) performing automated record updates comprising registration, modification, termination, or removal of liens, mortgages, encumbrances, digital pledges, or digital liens, or other asset-based obligations through on-chain or off-chain digital records or registries;

(c) integrating with financial contracts, smart contracts, or digitally represented agreements, wherein the agreements comprise collateral agreements, custody agreements, ISDA agreements, or other financial instruments represented in digital form, to automatically enforce asset-based obligations, collateralization requirements, lifecycle conditions, or compliance mandates within the tokenization module, the conversion module, the redemption module, or the detokenization module;

(d) automatically synchronizing asset status, registry data, the linkage or pledge data, and ownership updates upon execution of detokenization operations, redemption operations, liquidation events, conversion operations, or other lifecycle operations, wherein such synchronization updates are applied to on-chain and off-chain systems, financial registries, custodial systems, mortgage systems, lien systems, or asset verification platforms;

(e) reconciling decentralized ledger implementations with centralized financial records by validating, cross-checking, and updating asset token states, digital currency unit states, persistent lifecycle records, and transaction histories using smart contract logic, verification modules, oracle-provided data, or automated reconciliation protocols; or (f) ingesting, validating, and recording external data originating from oracle networks, pricing feeds, asset verification APIs, custodial systems, or off-chain financial infrastructure, wherein such data is utilized by the tokenization module, the conversion module, the redemption module, or the detokenization module to determine tokenizable value, maintain the linkage or pledge data, verify lifecycle conditions, execute compliance checks, or maintain synchronization across on-chain and off-chain representations of the validated underlying assets or underlying reserves.

* * * * *